(12) United States Patent
Santiago, Jr. et al.

(10) Patent No.: US 11,020,899 B2
(45) Date of Patent: *Jun. 1, 2021

(54) ADDITIVE MANUFACTURING SYSTEM WITH EXTENDED PRINTING VOLUME, AND METHODS OF USE THEREOF

(71) Applicant: Stratasys, Inc., Eden Prairie, MN (US)

(72) Inventors: Alfredo Santiago, Jr., Andover, MN (US); Joseph LaBossiere, Rogers, MN (US); Kevin Johnson, Minneapolis, MN (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 572 days.

This patent is subject to a terminal disclaimer.

(21) Appl. No.: 15/858,855

(22) Filed: Dec. 29, 2017

(65) Prior Publication Data

US 2018/0141273 A1 May 24, 2018

Related U.S. Application Data

(63) Continuation-in-part of application No. 15/581,651, filed on Apr. 28, 2017, now Pat. No. 10,549,517, (Continued)

(51) Int. Cl.
*B29C 64/20* (2017.01)
*B33Y 30/00* (2015.01)
(Continued)

(52) U.S. Cl.
CPC ............ *B29C 64/20* (2017.08); *B29C 64/106* (2017.08); *B29C 64/112* (2017.08);
(Continued)

(58) Field of Classification Search
CPC ............................ B29C 64/118; B29C 64/171
(Continued)

(56) References Cited

U.S. PATENT DOCUMENTS

| 4,567,489 A | 1/1986 | Obstfelder et al. |
| 4,728,392 A | 3/1988 | Miura et al. |

(Continued)

FOREIGN PATENT DOCUMENTS

| CN | 102905876 A | 1/2013 |
| DE | 102010015451 A1 | 10/2011 |

(Continued)

OTHER PUBLICATIONS

Canadian Office Action dated Aug. 11, 2017 for corresponding Canadian Application No. 2,880,307, filed Feb. 20, 2014.
(Continued)

*Primary Examiner* — Galen H Hauth
(74) *Attorney, Agent, or Firm* — Westman, Champlin & Koehler, P.A.

(57) ABSTRACT

An additive manufacturing system for printing three-dimensional (3D) parts includes a print foundation, a print head, a drive mechanism, and a supporting surface that creates an air bearing for parts under construction as they move through the system. The print head is configured to print a 3D part onto the print foundation in a layer-by-layer manner in a vertical print plane. The drive mechanism is configured to index the print foundation substantially along a horizontal print axis during printing of the 3D part. The support surface is provided by a table extending along the horizontal axis. The table has a plurality of air jets forming an air platen, which generates the air bearing for supporting the 3D part as it is incremented along the print axis.

9 Claims, 19 Drawing Sheets

Related U.S. Application Data which is a continuation of application No. 13/968,033, filed on Aug. 15, 2013, now Pat. No. 9,636,868, and a continuation-in-part of application No. 13/587,009, filed on Aug. 16, 2012, now Pat. No. 9,168,697.

(51) Int. Cl.
  *B29C 64/112* (2017.01)
  *B33Y 10/00* (2015.01)
  *B29C 64/106* (2017.01)
  *B29C 64/118* (2017.01)
  *B29C 64/245* (2017.01)

(52) U.S. Cl.
  CPC .......... *B29C 64/118* (2017.08); *B29C 64/245* (2017.08); *B33Y 10/00* (2014.12); *B33Y 30/00* (2014.12)

(58) Field of Classification Search
  USPC ......................................................... 198/493
  See application file for complete search history.

(56) References Cited

U.S. PATENT DOCUMENTS

| | | | |
|---|---|---|---|
| RE32,684 E * | 5/1988 | Lenhart | B65G 51/03 406/84 |
| 4,744,702 A * | 5/1988 | Wiseman | B65G 51/03 406/88 |
| 5,121,329 A | 6/1992 | Crump | |
| 5,169,081 A | 12/1992 | Goedderz | |
| 5,303,141 A | 4/1994 | Batchelder et al. | |
| 5,312,224 A | 5/1994 | Batchelder et al. | |
| 5,340,433 A | 8/1994 | Crump | |
| 5,370,467 A | 12/1994 | Ikehata et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,193,923 B1 | 2/2001 | Leyden et al. | |
| 6,228,923 B1 | 5/2001 | Lombardi | |
| 6,257,517 B1 | 7/2001 | Babish et al. | |
| 6,547,995 B1 | 4/2003 | Comb | |
| 6,645,412 B2 | 11/2003 | Priedeman, Jr. et al. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,869,559 B2 | 3/2005 | Hopkins | |
| 6,923,634 B2 | 6/2005 | Swanson et al. | |
| 6,998,087 B1 | 2/2006 | Hanson et al. | |
| 7,122,246 B2 | 10/2006 | Comb et al. | |
| 7,172,715 B2 | 2/2007 | Swanson et al. | |
| 7,236,166 B2 | 6/2007 | Zinniel et al. | |
| 7,384,255 B2 | 6/2008 | LaBossiere et al. | |
| 7,428,959 B2 * | 9/2008 | Jung | B65G 49/063 198/493 |
| 7,604,470 B2 | 10/2009 | LaBossiere et al. | |
| 7,625,200 B2 | 12/2009 | Leavitt | |
| 7,891,964 B2 | 2/2011 | Skubic et al. | |
| 7,896,209 B2 | 3/2011 | Batchelder et al. | |
| 7,936,351 B2 | 5/2011 | Taatjes et al. | |
| 7,938,351 B2 | 5/2011 | Taatjes et al. | |
| 7,938,356 B2 | 5/2011 | Taatjes et al. | |
| 8,033,811 B2 | 10/2011 | Swanson et al. | |
| 8,075,300 B2 | 12/2011 | Zinniel | |
| 8,123,999 B2 | 2/2012 | Priedeman, Jr. et al. | |
| 8,153,182 B2 | 4/2012 | Comb et al. | |
| 8,215,371 B2 | 7/2012 | Batchelder | |
| 8,221,669 B2 | 7/2012 | Batchelder et al. | |
| 8,236,227 B2 | 8/2012 | Batchelder et al. | |
| 8,246,888 B2 | 8/2012 | Hopkins et al. | |
| 8,403,658 B2 | 3/2013 | Swanson | |
| 8,459,280 B2 | 6/2013 | Swanson et al. | |
| 8,647,102 B2 | 2/2014 | Swanson et al. | |
| 8,658,250 B2 | 2/2014 | Batchelder et al. | |
| 8,985,497 B2 | 3/2015 | Mannella et al. | |
| 9,073,263 B2 | 7/2015 | Mannella et al. | |
| 9,168,697 B2 * | 10/2015 | Crump | B29C 64/25 |
| 9,636,868 B2 * | 5/2017 | Crump | B29C 64/112 |
| 10,549,517 B2 * | 2/2020 | Crump | B29C 64/112 |
| 2005/0129941 A1 | 6/2005 | Comb et al. | |
| 2007/0003656 A1 | 1/2007 | LaBossiere et al. | |
| 2007/0228590 A1 | 10/2007 | LaBossiere et al. | |
| 2008/0121172 A1 | 5/2008 | Kritchman et al. | |
| 2008/0169585 A1 | 7/2008 | Zinniel | |
| 2008/0213419 A1 | 9/2008 | Skubic et al. | |
| 2009/0020901 A1 | 1/2009 | Schillen et al. | |
| 2009/0035405 A1 | 2/2009 | Leavitt | |
| 2009/0101278 A1 | 4/2009 | Laberge-Lebel et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0005987 A1 | 1/2010 | Shapira | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0100224 A1 | 4/2010 | Comb et al. | |
| 2010/0161105 A1 | 6/2010 | Blake | |
| 2010/0283172 A1 | 11/2010 | Swanson | |
| 2010/0327479 A1 | 12/2010 | Zinniel et al. | |
| 2011/0054663 A1 | 3/2011 | Matsui et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2011/0233804 A1 | 9/2011 | Batchelder et al. | |
| 2012/0046779 A1 | 2/2012 | Pax et al. | |
| 2012/0067501 A1 | 3/2012 | Lyons | |
| 2012/0068378 A1 | 3/2012 | Swanson et al. | |
| 2012/0070523 A1 | 3/2012 | Swanson et al. | |
| 2012/0105903 A1 | 5/2012 | Pettis | |
| 2012/0162314 A1 | 6/2012 | Swanson et al. | |
| 2012/0164256 A1 | 6/2012 | Swanson et al. | |
| 2012/0164330 A1 | 6/2012 | Swanson et al. | |
| 2013/0026680 A1 | 1/2013 | Ederer et al. | |
| 2013/0269731 A1 | 10/2013 | Crouch et al. | |
| 2014/0048980 A1 * | 2/2014 | Crump | B29C 64/118 264/401 |

FOREIGN PATENT DOCUMENTS

| | | |
|---|---|---|
| GB | 816016 | 7/1959 |
| JP | 2007098948 A | 4/2007 |
| JP | 2010510100 A | 4/2010 |
| JP | 2010517830 A | 5/2010 |
| WO | 2011127897 A2 | 10/2011 |
| WO | 2012037329 A2 | 3/2012 |
| WO | 2012100297 A1 | 8/2012 |

OTHER PUBLICATIONS www.envisiontec.com, "3D-Bioplotter", Datasheet, Mar. 2011.
International Search Report and Written Opinion dated Oct. 22, 2013, from International Application No. PCT/US2013/055311.
Australian Examination Report dated Oct. 8, 2015 for corresponding Australian Patent Application No. 2013302496, filed Feb. 11, 2015.
Chinese Office Action dated Feb. 29, 2016 for corresponding Chinese Application No. 201380043692.1, filed Feb. 13, 2015.

(56) References Cited

OTHER PUBLICATIONS

Supplementary European Search Report dated Mar. 1, 2016 for corresponding European Patent Application No. 13829416.0, filed Feb. 3, 2015.
Korean Office Action dated Apr. 11, 2016 for corresponding Korean Application No. 10-2015-7006115, filed Mar. 9, 2015.
Canadian Examiner's Reported dated Jun. 2, 2016, for corresponding Canadian Application No. 2,880,307 filed Jan. 26, 2015.
Chinese Office Action dated Oct. 10, 2016 for corresponding Chinese Application No. 201380043692.1, filed Feb. 13, 2015.
Chinese Office Action dated Jan. 26, 2017 for corresponding Chinese Application No. 201380043692.1, filed Feb. 13, 2015.
Canadian Office Action dated Mar. 26, 2018 for corresponding Canadian Application No. 2880307, filed Jan. 26, 2015.
China Office Action, 201822277380.X, dated Aug. 28, 2019, 5 pages.
Brazil Office Action, BR112015003274, dated Dec. 3, 2019, 6 pages.
Extended European search report for European application No. 19150008.1, dated May 17, 2019, 9 pages.

* cited by examiner

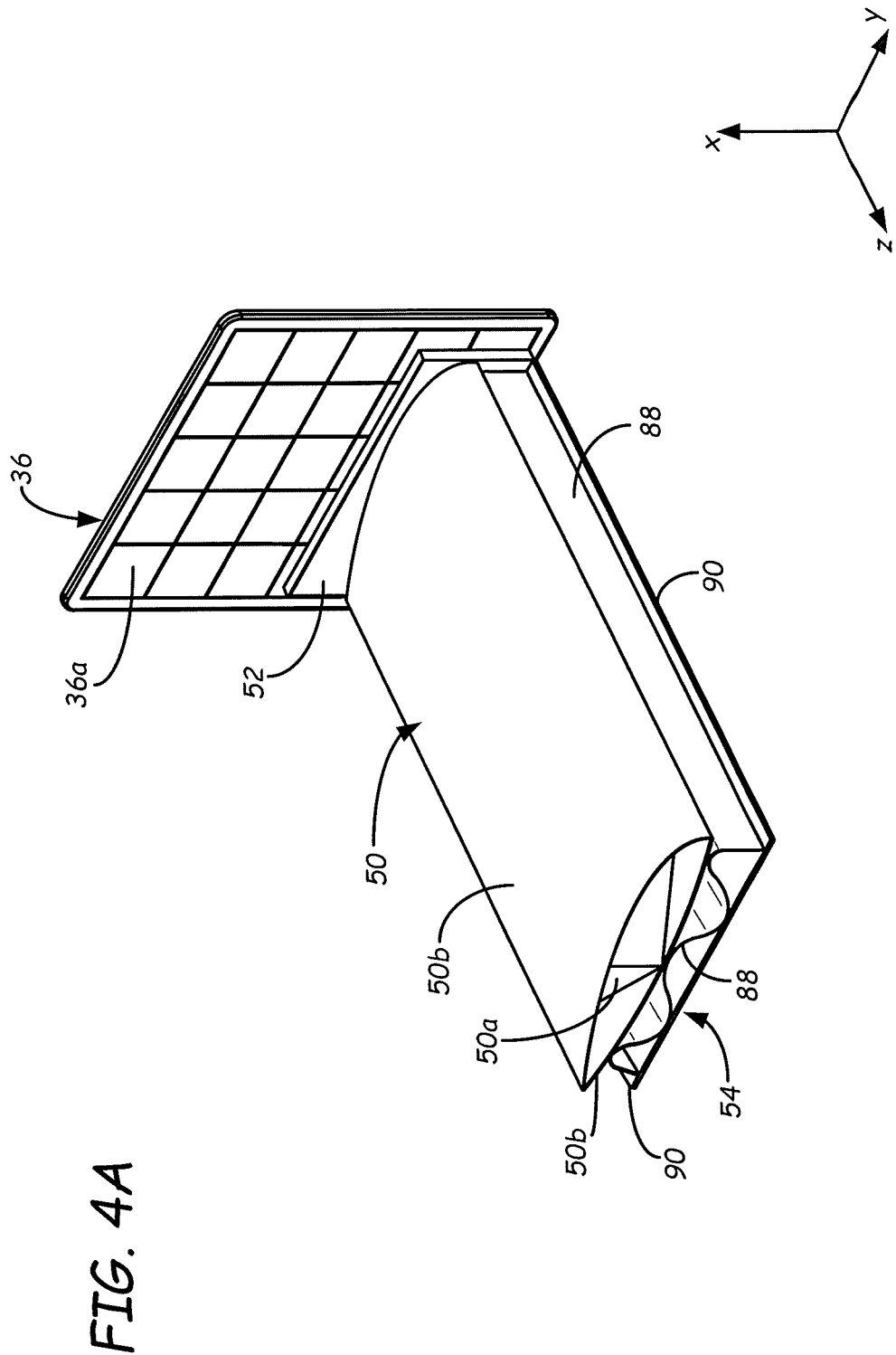

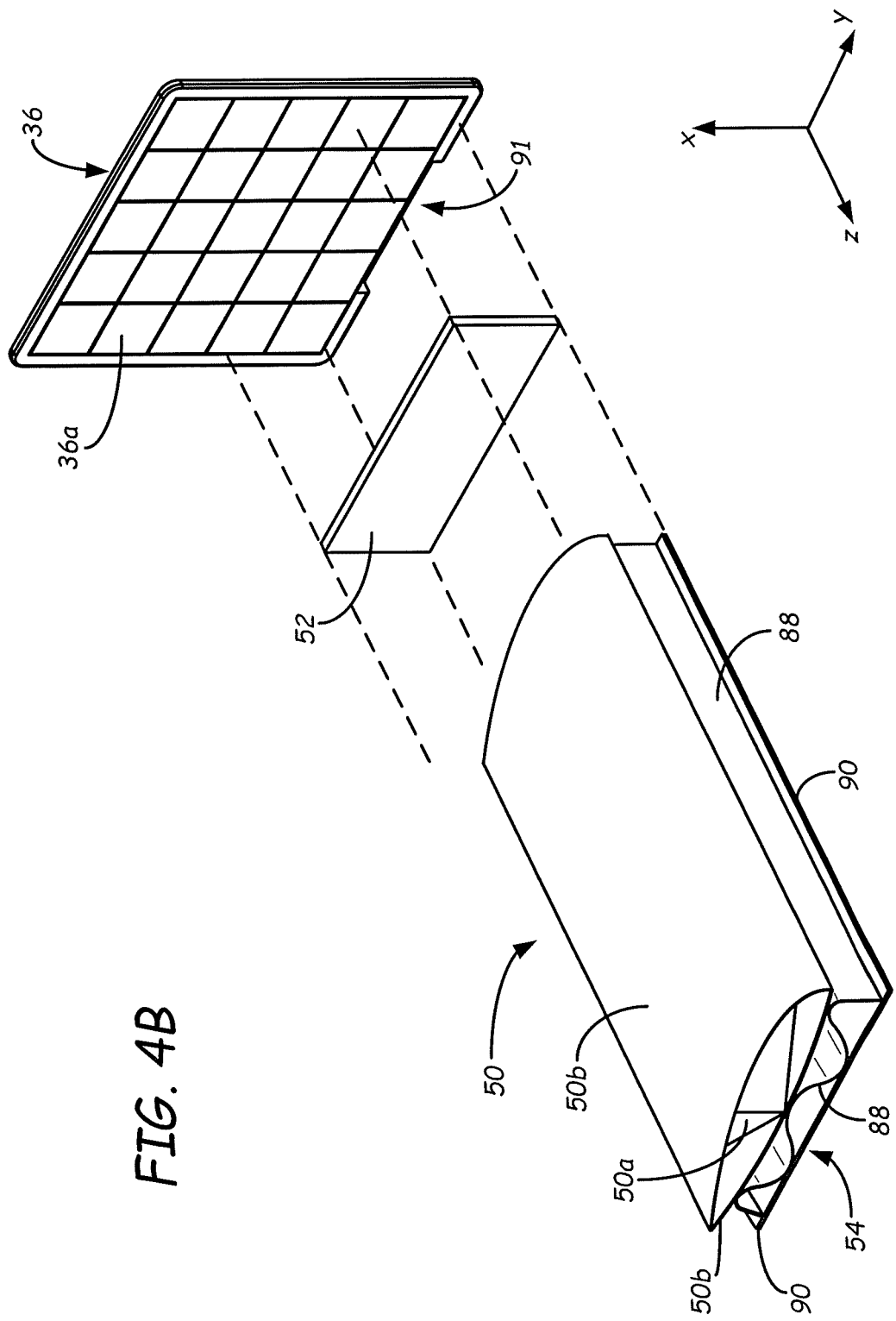

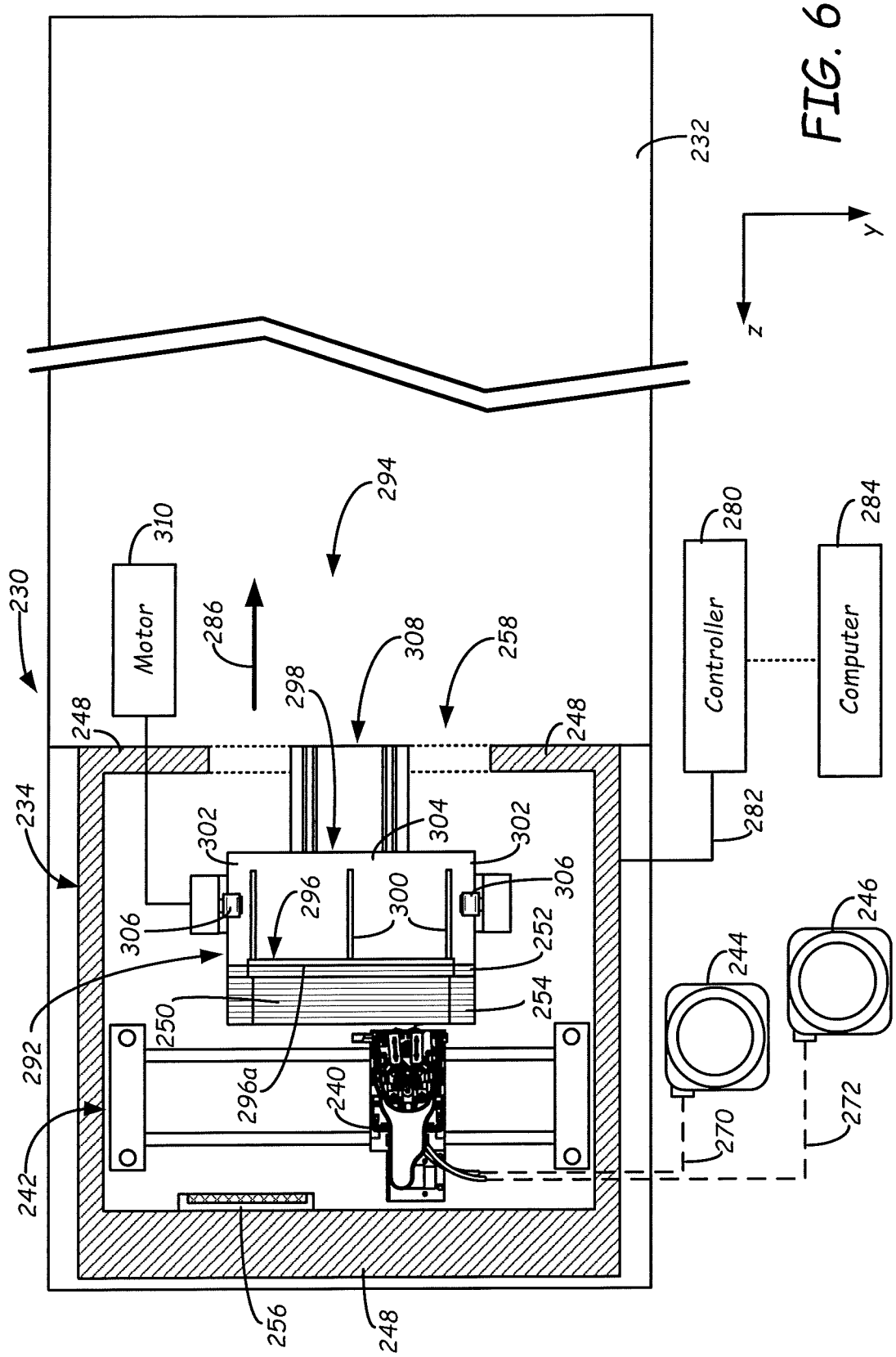

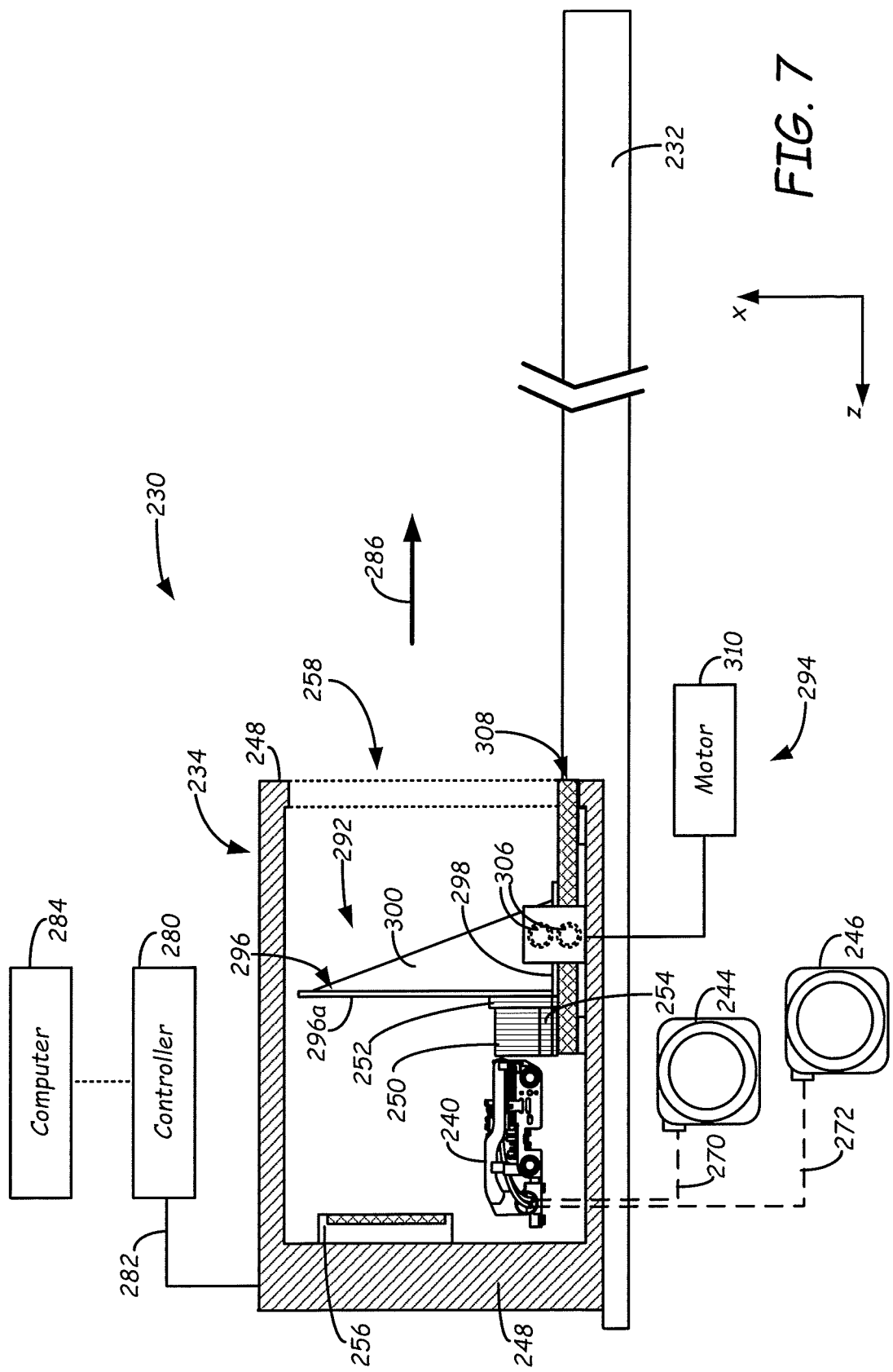

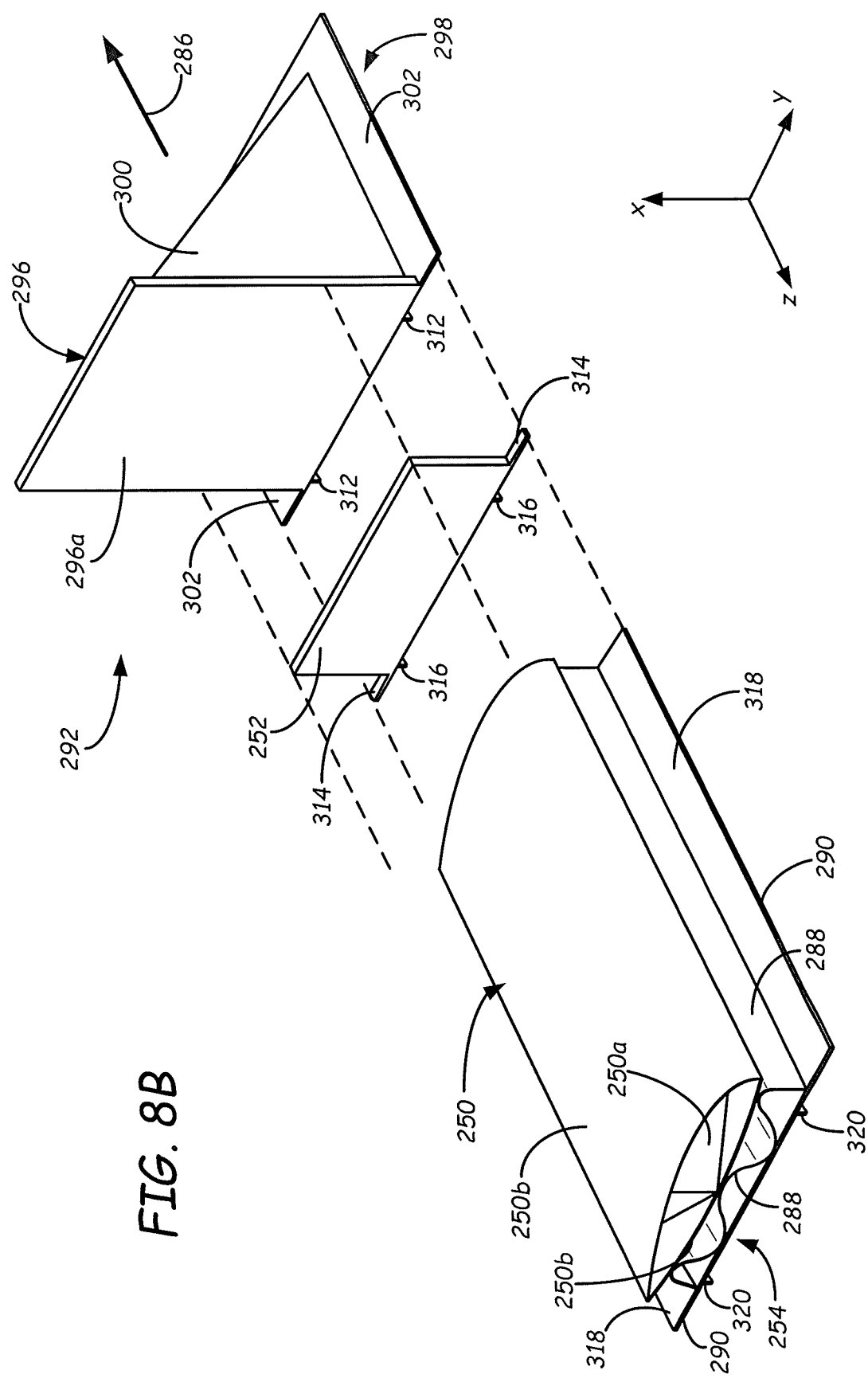

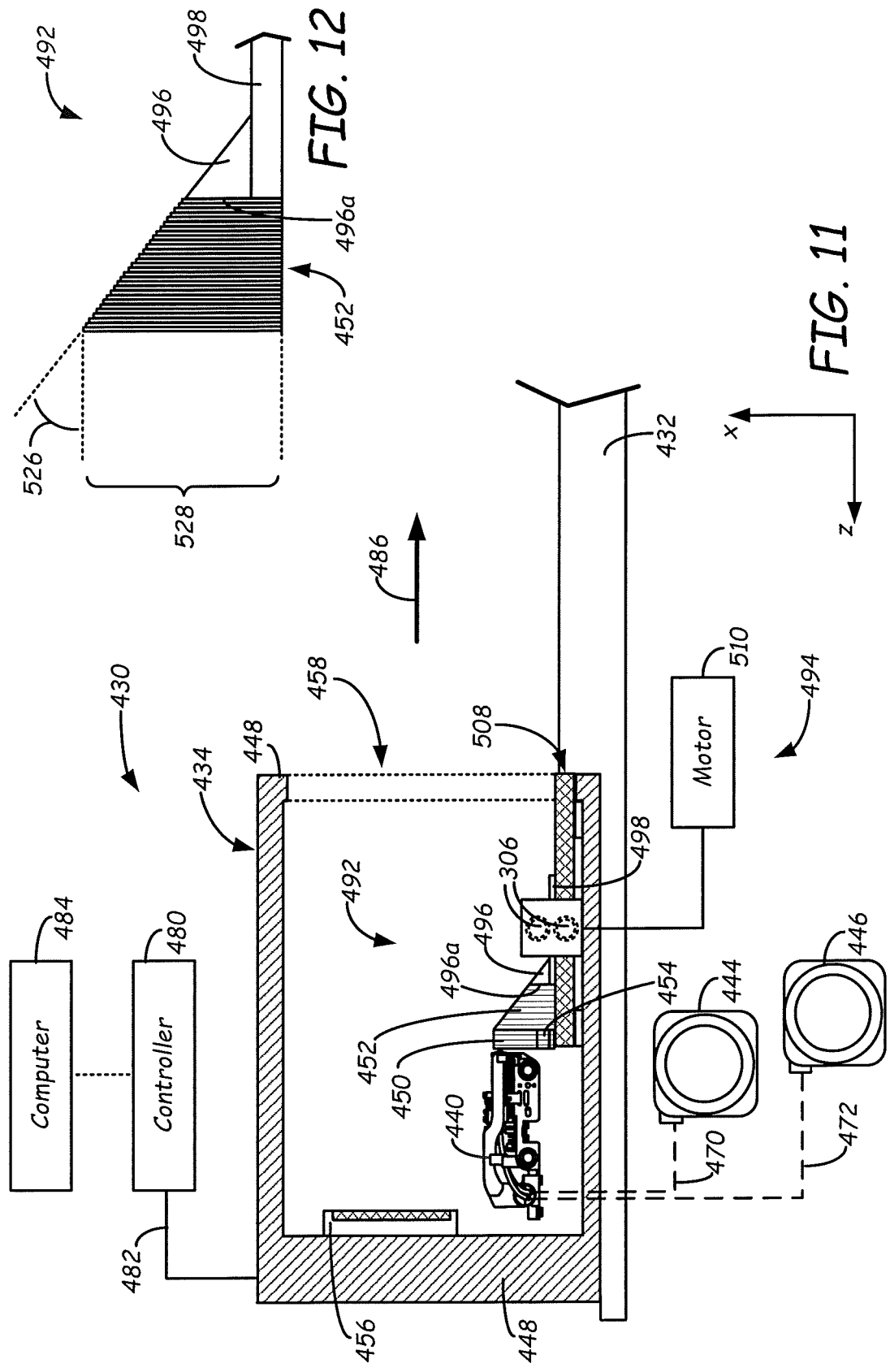

ADDITIVE MANUFACTURING SYSTEM WITH EXTENDED PRINTING VOLUME, AND METHODS OF USE THEREOF

CROSS-REFERENCE TO RELATED APPLICATIONS

This application is a continuation-in-part of U.S. patent application Ser. No. 15/581,651 filed on Apr. 28, 2017, which is a continuation of U.S. patent application Ser. No. 13/968,033 (issued as U.S. Pat. No. 9,636,868) filed on Aug. 15, 2013; and is a continuation-in-part of U.S. patent application Ser. No. 13/587,009 (issued as U.S. Pat. No. 9,168,697), filed on Aug. 16, 2012. Each of the above-referenced applications are incorporated herein by reference.

BACKGROUND

The present disclosure relates to additive manufacturing systems for building three-dimensional (3D) parts with layer-based, additive manufacturing techniques. In particular, the present disclosure relates to additive manufacturing systems for printing large 3D parts, and methods for printing 3D parts in the additive manufacturing systems.

Additive manufacturing, or 3D printing, is generally an additive manufacturing process in which a three-dimensional (3D) object or part is built utilizing a computer model of the objects. The typical operation consists of slicing a three-dimensional computer model into thin cross sections, translating the result into layerwise position data, and feeding the data to control a printer which manufactures a three-dimensional structure in a layerwise manner using one or more additive manufacturing techniques. Examples of commercially available additive manufacturing techniques include extrusion-based techniques (e.g., fused deposition modeling), jetting, selective laser sintering, powder/binder jetting, electron-beam melting, and stereolithographic processes.

In an extrusion-based additive manufacturing system, a 3D part may be printed from a digital representation of the 3D part in a layer-by-layer manner by extruding a flowable part material along tool paths that are generated from a digital representation of the part. The part material is extruded through an extrusion tip or nozzle carried by a print head of the system, and is deposited as a sequence of roads while the print head moves along the tool paths. The extruded part material fuses to previously deposited part material, and solidifies upon a drop in temperature. In a typical printer, the material is deposited in planar layers as a sequence of roads built up on a substrate that defines a build plane. The position of the print head relative to the substrate is then incremented along a print-axis (perpendicular to the build plane), and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

Embodiments of the present disclosure are directed to an additive manufacturing system for printing 3D parts, and a method of using the system. One embodiment of the additive manufacturing system includes a print foundation, a print head, a drive mechanism, and a supporting surface that creates an air bearing for parts under construction as they move through the system. The print head is configured to print a 3D part onto the print foundation in a layer-by-layer manner in a vertical print plane. The drive mechanism is configured to index the print foundation substantially along a horizontal print axis during printing of the 3D part. The support surface is provided by a table extending along the horizontal axis. The table has a plurality of air jets forming an air platen, which generates the air bearing for supporting the 3D part as it is incremented along the print axis.

In one embodiment of the method, a 3D part is printed onto a print foundation in a layer-by-layer manner in a vertical print plane. The print foundation is indexed along a horizontal axis using a drive mechanism during printing the 3D part. A portion of the 3D part is supported on an air bearing on a table surface formed by a plurality of air jets during indexing of the print foundation along the horizontal axis.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis. Furthermore, in embodiments in which the printed layers are planar, the printing axis is normal to the build plane of the layers.

The term "printing onto", such as for "printing a 3D part onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D part onto a print foundation may include (i) a situation in which the 3D part is directly printed onto to the print foundation, (ii) a situation in which the 3D part is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

BRIEF DESCRIPTION OF THE DRAWINGS

FIG. 4A is a perspective view of a 3D part, support structure, and scaffold printed on the platen.

FIG. 4B is an exploded perspective view of the 3D part, support structure, and scaffold printed on the platen.

FIG. 6 is a top view of a second example additive manufacturing system of the present disclosure having a platen starter piece for printing a 3D part horizontally.

FIG. 7 is a side view of the second example system.

FIG. 8B is an exploded perspective view of the 3D part, support structure, and scaffold printed on the platen starter piece.

FIG. 11 is a side view of the third example system.

FIG. 12 is an expanded side view of the wedge starter piece, illustrating a technique for printing a support structure.

DETAILED DESCRIPTION

The present disclosure is directed to an additive manufacturing system configured to print 3D parts that are longer than a print environment of the additive manufacturing system. In some embodiments, the print or build environment of the additive manufacturing system, in which layers of the parts are formed, includes a heated chamber having a port that opens the chamber to ambient conditions outside of the chamber. In other embodiments, the print environment is at ambient conditions or has localized heating proximate a deposition volume. The system also includes one or more print heads configured to print a 3D part in a layer-by-layer manner onto a print foundation (e.g., a platen or other component having a receiving surface).

As the printed 3D part grows through the printing process, a length of the 3D part may be indexed or otherwise moved beyond the print environment, such as through a port of the heated chamber. The printed 3D part may continue to grow beyond the print environment until a desired length or height is achieved. This expands the printable volume along a printing axis of the system, allowing long or tall 3D parts, such as airfoils, manifolds, fuselages, and the like to be printed in a single printing operation. As such, the 3D parts may be larger than the dimensions of the print environment of the additive manufacturing system.

As discussed further below, the additive manufacturing system may be configured to print 3D parts in a horizontal direction, a vertical direction, or along other orientations (e.g., slopes relative to the horizontal and vertical directions). In each of these embodiments, the layers of a printed 3D part may be stabilized by one or more printed "scaffolds", which brace the 3D part laterally relative to the printing axis of the system to address forces parallel to the build plane. This is in comparison to a printed "support structure", which supports a bottom surface of the 3D part relative to the printing axis of the system to address forces that are normal to the build plane.

Figure 1A:
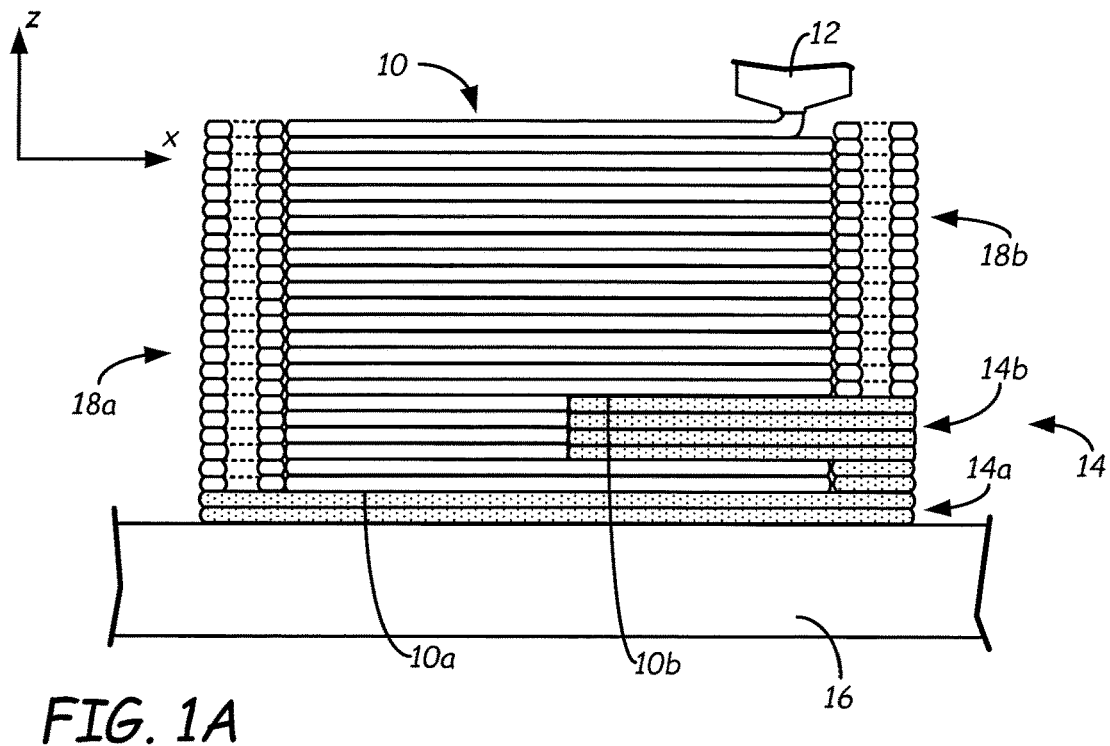
FIG. 1A is a side view of a 3D part being printed with a support structure and scaffold, illustrating a vertical printing axis.

For example, FIG. 1A is a simplified front view of 3D part 10 being printed in a layer-by-layer manner from print head nozzle 12, where the layers of the 3D part 10 grow along the vertical z-axis. As such, the "printing axis" in FIG. 1A is the vertical z-axis, and each layer extends parallel to a horizontal x-y build plane (y-axis not shown).

The layers of 3D part 10 are printed on layers of support structure 14, which are correspondingly disposed on platen 16. Support structure 14 includes a first series of printed layers 14a that support the bottom surface 10a of 3D part 10 along the printing axis (i.e., along the vertical z-axis), thereby address forces that are normal to the build plane. Layers 14a assist in adhering 3D part 10 to platen 16 or other suitable print foundation, and for reducing the risk of having layers 14a curl, while also allowing 3D part 10 to be removed from platen 16 without damaging 3D part 10. In addition, support structure 14 includes a second series of printed layers 14b that support overhanging surface 10b of 3D part 10 along the printing axis. In each instance, the layers of support structure 14 (e.g., layers 14a and 14b) support the bottom surfaces of 3D part 10 (e.g., bottom surfaces 10a and 10b) along the printing axis, thereby further addressing forces that are normal to the build plane.

In comparison, layers of scaffolds 18a and 18b are printed at lateral locations relative to 3D part 10 and are not used to support bottom surfaces 10a and 10b. Rather, scaffolds 18a and 18b, illustrated as tubular scaffolds extending along the z-axis, are printed to brace the lateral sides of 3D part 10 to function as buttresses to address forces parallel to the build plane. For example, in some instances, such as when 3D part 10 is tall and narrow, the adhesion between layers 14a and 3D part 10 may not be sufficient to prevent the top-most layers of 3D part 10 from wobbling during the printing operation. The wobbling of 3D part 10 can reduce the registration between print head nozzle 12 and 3D part 10, potentially resulting in reduced printing accuracies. Scaffolds 18a and 18b, however, provide a suitable mechanism to brace 3D part 10 at one or more lateral locations relative to the printing axis (i.e., the vertical z-axis), to stabilize 3D part 10 against wobbling.

Figure 1B:
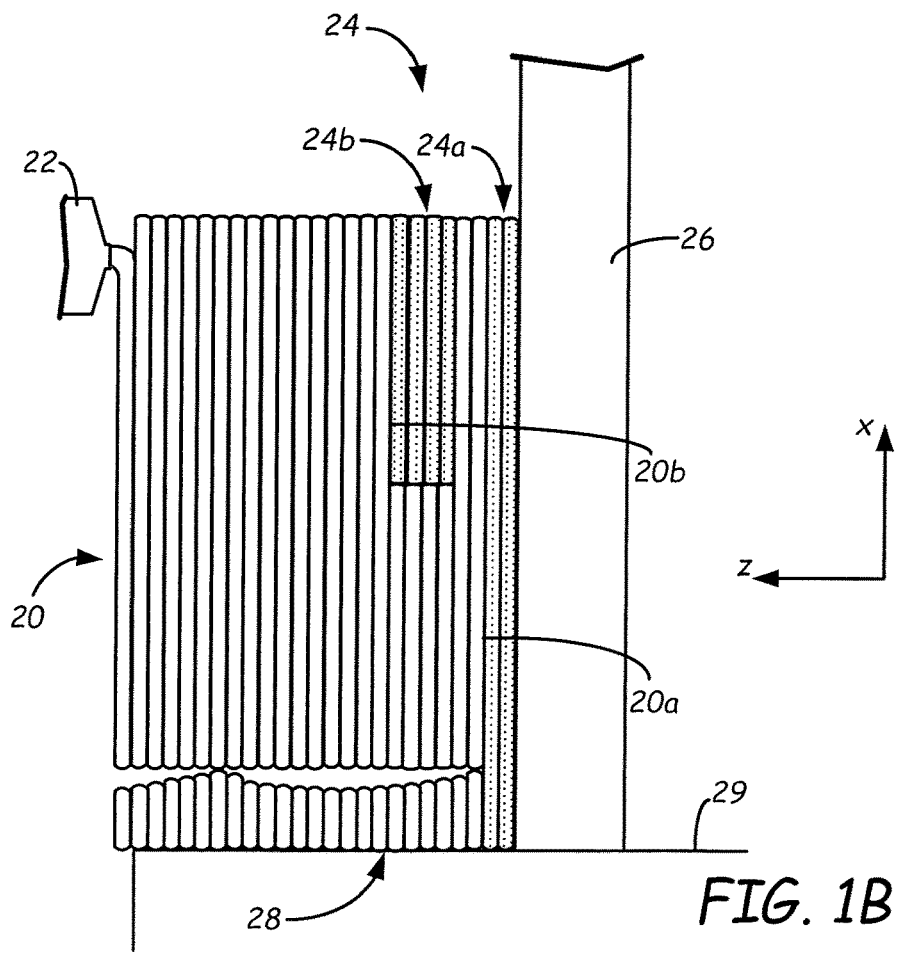
FIG. 1B is a side view of a 3D part being printed with a support structure and scaffold, illustrating a horizontal printing axis.

Alternatively, FIG. 1B shows 3D part 20 being printed in a layer-by-layer manner from print head nozzle 22, where the layers of the 3D part 20 grow horizontally along the z-axis. As such, the "printing axis" in FIG. 1B is a horizontal z-axis axis, and each layer extends parallel to a vertical x-y build plane (y-axis not shown).

In this situation, the layers of 3D part 20 are printed on layers of support structure 24, which are correspondingly disposed on platen 26. Support structure 24 includes a first series of printed layers 24a that support the bottom surface 20a of 3D part 20 along the printing axis (i.e., along the horizontal z-axis), and a second series of printed layers 14b that support overhanging surface 20b of 3D part 20 along the printing axis. In each instance, the layers of support structure 24 (e.g., layers 24a and 24b) support the bottom surfaces of 3D part 20 (e.g., bottom surfaces 20a and 20b) along the printing axis to address forces that are normal to the build plane.

In comparison, layers of scaffold 28 are printed at lateral locations relative to the layers of 3D part 20 and are not used to support bottom surfaces 20a and 20b. Rather, scaffold 28 is printed to brace the lateral side of 3D part 20 relative to the printing axis, which is the vertical bottom side of 3D part 20 in the view shown in FIG. 1B. In this horizontal situation, scaffold 28 braces 3D part 20, preventing 3D part 20 from sagging in a direction parallel to the build plane under gravity during the printing operation.

For example, in some instances, such as when 3D part 20 is long and narrow, the cantilevered adhesion between layers 24a and 3D part 20 may not be sufficient to prevent the remote-most layers of 3D part 20 from sagging under gravity during the printing operation. As such, scaffold 28 provides a suitable mechanism to brace 3D part 20 at one or more lateral locations relative to the printing axis (i.e., the horizontal z-axis), reducing the risk of sagging. Scaffold 28 itself can then rest on and slide along an underlying surface 29 in the y-z plane.

For ease of discussion, the z-axis is used herein when referring to the printing axis regardless of the printing orientation. For a vertical printing operation, such as shown in FIG. 1A, the printing z-axis is a vertical or near-vertical axis, and each layer of the 3D part, support structure, and scaffold extend along a horizontal x-y build plane. Alternatively, for a horizontal printing operation, such as shown in FIG. 1B, the printing z-axis is a horizontal axis, and each layer of the 3D part, support structure, and scaffold extend along the vertical x-y build plane. In further alternative embodiments, the layers of 3D parts, support structures, and scaffolds may be grown along any suitable axis. As used herein, a "horizontal" z-axis includes print axes that are within 45 degrees of horizontal.

Additionally, while FIGS. 1A and 1B illustrate flat build planes (i.e., each layer is planar), in further alternative embodiments, the layers of the 3D parts, support structures, and/or scaffolds may be non-planar. For example, the layers of a given 3D part may each exhibit gentle curvatures from a flat build plane. In these embodiments, the build plane may be determined as an average plane of the curvatures. Unless expressly stated otherwise, the term "build plane" is not intended to be limited to a flat plane.

As further discussed below, in some embodiments, the receiving surfaces on which the 3D parts, support structures, and/or scaffolds are printed on may have cross-sectional areas in the build plane that are smaller than the footprint areas of the 3D parts, support structures, and/or scaffolds. For example, the receiving surface of a print foundation may have a cross-sectional area that is smaller than the footprint areas of an intended 3D part. In this situation, layers of a support structure and/or scaffold may be printed with increasing cross-sectional areas until they at least encompass the footprint areas of the intended 3D part. This allows small print foundations to be used with the additive manufacturing systems of the present disclosure. Furthermore, this allows multiple, successive 3D parts to be printed with scaffolds that function as receiving surfaces.

Horizontal Printing

FIGS. 2-14 illustrate exemplary additive manufacturing systems of the present disclosure having extended printing volumes for printing long 3D parts horizontally, such as discussed above for 3D part 20 (shown in FIG. 1B), where the 3D parts have a length that is greater than a print or build environment, in which layers of the parts are formed. FIGS. 2-5 illustrate system 30, which is a first example additive manufacturing system for printing or otherwise building 3D parts, support structures, and/or scaffolds horizontally using a layer-based, additive manufacturing technique. Suitable systems for system 30 include extrusion-based additive manufacturing systems developed by Stratasys, Inc., Eden Prairie, Minn. under the trademarks "FDM".

Figure 2:
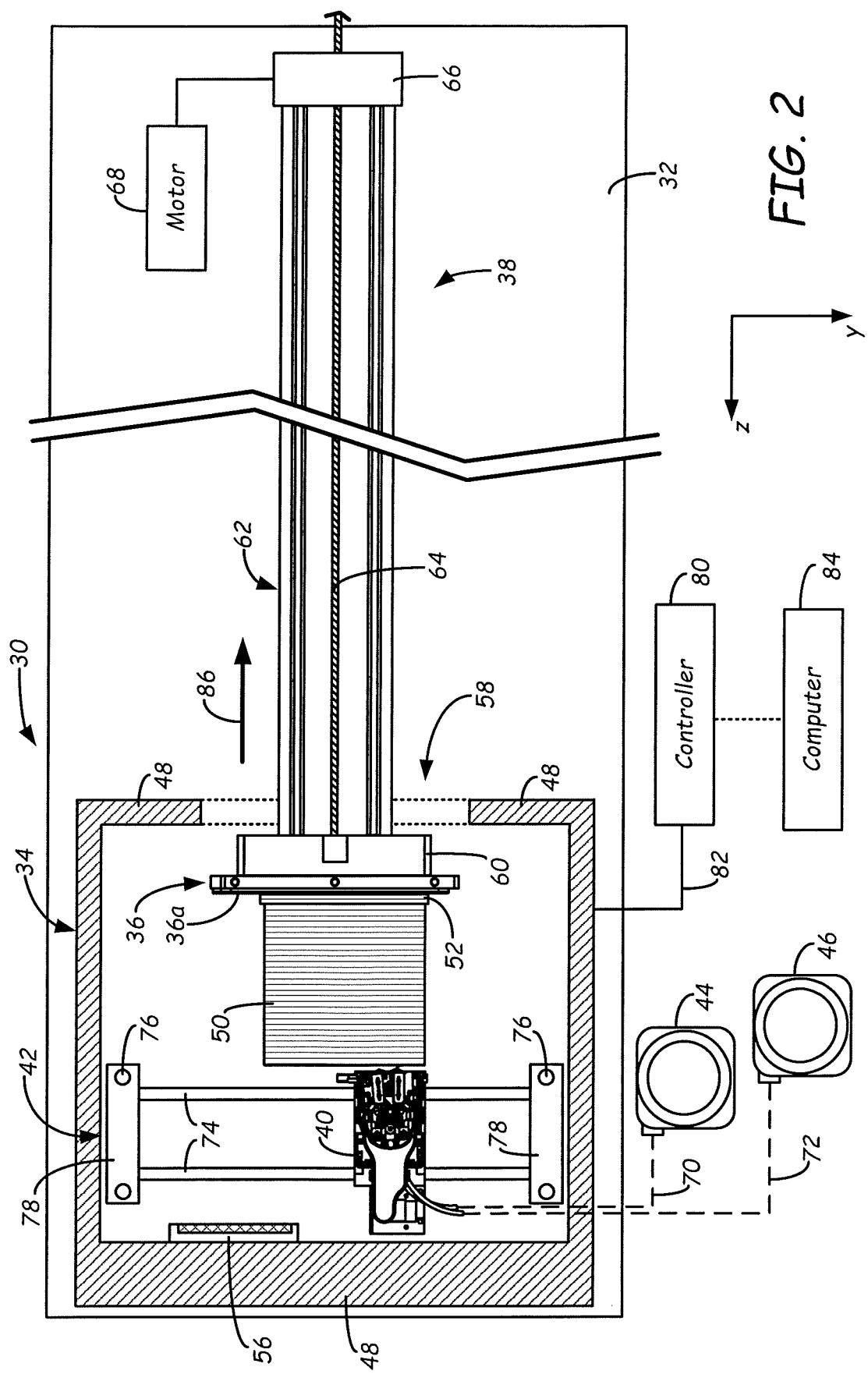
FIG. 2 is a top view of a first example additive manufacturing system of the present disclosure having a platen and platen gantry for printing a 3D part horizontally.

As shown in FIG. 2, system 30 may rest on a table or other suitable surface 32, and includes chamber 34, platen 36, platen gantry 38, print head 40, head gantry 42, and consumable assemblies 44 and 46. Chamber 34 is an enclosed environment having chamber walls 48, and initially contains platen 36 for printing 3D parts (e.g., 3D part 50), support structures (e.g., support structure 52), and/or scaffolds (e.g., scaffold 54, shown in FIGS. 3-5). While a chamber 34 is illustrated, the present disclosure is not limited to a system with a chamber. Rather, the system can include any suitable build environment including printing in ambient conditions and with localized heating outside of a chamber.

In the shown embodiment, chamber 34 includes heating mechanism 56, which may be any suitable mechanism configured to heat chamber 34, such as one or more heaters and air circulators to blow heated air throughout chamber 34. Heating mechanism 56 may heat and maintain chamber 34, at least in the vicinity of print head 40, at one or more temperatures that are in a window between the solidification temperature and the creep relaxation temperature of the part material and/or the support material. This reduces the rate at which the part and support materials solidify after being extruded and deposited (e.g., to reduce distortions and curling), where the creep relaxation temperature of a material is proportional to its glass transition temperature. Examples of suitable techniques for determining the creep relaxation temperatures of the part and support materials are disclosed in Batchelder et al., U.S. Pat. No. 5,866,058.

Chamber walls 48 maybe any suitable barrier to reduce the loss of the heated air from the build environment within chamber 34, and may also thermally insulate chamber 34. As shown, chamber walls 48 include port 58 extending laterally therethrough to open chamber 34 to ambient conditions outside of system 30. Accordingly, system 30 exhibits a thermal gradient at port 58, with one or more elevated temperatures within chamber 34 that drop to the ambient temperature outside of chamber 34 (e.g., room temperature, about 25° C.).

In some embodiments, system 30 may be configured to actively reduce the heat loss through port 58, such as with an air curtain, thereby improving energy conservation. Furthermore, system 30 may also include one or more permeable barriers at port 58, such as insulating curtain strips, a cloth or flexible lining, bristles, and the like, which restrict air flow out of port 58, while allowing platen 36 to pass therethrough.

Platen 36 is a print foundation having receiving surface 36a, where 3D part 50, support structure 52, and scaffold 54 are printed horizontally in a layer-by-layer manner onto receiving surface 36a. In some embodiments, platen 36 may also include a flexible polymeric film or liner, which may function as receiving surface 36a. Platen 36 is supported by platen gantry 38, which is a gantry-based drive mechanism configured to index or otherwise move platen 36 along the printing z-axis. Platen gantry 38 includes platen mount 60, guide rails 62, screw 64, screw drive 66, and motor 68.

Platen mount 60 is a rigid structure that retains platen 36 such that receiving surface 36a is held parallel to the x-y plane. Platen mount 60 is slidably coupled to guide rails 62, which function as linear bearings to guide platen mount 60 along the z-axis, and to limit the movement of platen 36 to directions along the z-axis (i.e., restricts platen 36 from moving in the x-y plane). Screw 64 has a first end coupled to platen mount 60 and a second portion engaged with screw drive 66. Screw drive 66 is configured to rotate and draw screw 64, based on rotational power from motor 68, to index platen 36 along the z-axis.

In the shown example, print head 40 is a dual-tip extrusion head configured to receive consumable filaments or other materials from consumable assemblies 44 and 46 (e.g., via guide tubes 70 and 72) for printing 3D part 50, support structure 52, and scaffold 54 onto receiving surface 36a of platen 36. Examples of suitable devices for print head 40 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182.

In additional embodiments, in which print head 40 is an interchangeable, single-nozzle print head, examples of suitable devices for each print head 40, and the connections between print head 40 and head gantry 42 include those disclosed in Swanson et al., U.S. Pat. No. 8,647,102.

Further, in some embodiments, print head 40 may be a viscosity pump or screw extruder, such as those disclosed in Batchelder et al., U.S. Pat. Nos. 5,312,224 and 5,764,521; Skubic et al., U.S. Pat. No. 7,891,964; and Bosveld et al. U.S. application Ser. No. 29/571,664. The viscosity pump may be fed using filament, slug, or pellet materials.

Print head 40 is supported by head gantry 42, which is a gantry assembly configured to move print head 40 in (or substantially in) the x-y plane parallel to platen 36. For example, head gantry 42 may include y-axis rails 74, x-axis rails 76, and bearing sleeves 78. Print head 40 is slidably coupled to y-axis rails 74 to move along the horizontal y-axis (e.g., via one or more motor-driven belts and/or screws, not shown). Y-axis rails 74 are secured to bearing sleeves 78, which themselves are slidably coupled to x-axis rails 76, allowing print head 40 to also move along the vertical x-axis, or in any direction in the x-y plane (e.g., via the motor-driven belt(s), not shown). While the additive manufacturing systems discussed herein are illustrated as printing in a Cartesian coordinate system, the systems may alternatively operate in a variety of different coordinate systems. For example, head gantry 42 may move print head 40 in a polar coordinate system, providing a cylindrical coordinate system for system 30.

Suitable devices for consumable assemblies 44 and 46 include those disclosed in Swanson et al., U.S. Pat. No. 6,923,634; Comb et al., U.S. Pat. No. 7,122,246; Taatjes et al, U.S. Pat. Nos. 7,938,351 and 7,938,356; Swanson, U.S. Pat. No. 8,403,658; and Mannella et al., U.S. Pat. Nos. 9,073,263 and 8,985,497.

Suitable materials and filaments for use with print head 40 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Pat. Nos. 8,215,371, 2 8,221,669, 8,236,227, and 8,658,250; and Hopkins et al., U.S. Pat. No. 8,246,888. Examples of suitable average diameters for the filaments range from about 1.02 millimeters (about 0.040 inches) to about 3.0 millimeters (about 0.120 inches).

In a pellet-fed screw extruder, pellet or particle materials may be fed to the viscosity pump from hoppers (replacing consumable assemblies 44 and 46), such as described in Bosveld et al. U.S. Pat. No. 8,955,558. The materials are heated and sheared to an extrudable state in the screw extruder, and extruded from a nozzle of the extruder.

System 30 also includes controller 80, which is one or more control circuits configured to monitor and operate the components of system 30. For example, one or more of the control functions performed by controller 80 can be implemented in hardware, software, firmware, and the like, or a combination thereof. Controller 80 may communicate over communication line 82 with chamber 34 (e.g., heating mechanism 56), print head 40, motor 68, and various sensors, calibration devices, display devices, and/or user input devices.

In some embodiments, controller 80 may also communicate with one or more of platen 36, platen gantry 38, head gantry 42, and any other suitable component of system 30. While illustrated as a single signal line, communication line 82 may include one or more electrical, optical, and/or wireless signal lines, allowing controller 80 to communicate with various components of system 30. Furthermore, while illustrated outside of system 30, controller 80 and communication line 82 are desirably internal components to system 30.

System 30 and/or controller 80 may also communicate with computer 84, which is one or more computer-based systems that communicates with system 30 and/or controller 80, and may be separate from system 30, or alternatively may be an internal component of system 30. Computer 84 includes computer-based hardware, such as data storage devices, processors, memory modules and the like for generating and storing tool path and related printing instructions. Computer 84 may transmit these instructions to system 30 (e.g., to controller 80) to perform printing operations.

During operation, controller 80 may direct print head 40 to selectively draw successive segments of the part and support material filaments from consumable assemblies 44 and 46 (via guide tubes 70 and 72). Print head 40 thermally melts the successive segments of the received filaments such that they become molten flowable materials. The molten flowable materials are then extruded and deposited from print head 40, along the printing z-axis axis, onto receiving surface 36a for printing 3D part 50 (from the part material), support structure 52 (from the support material), and scaffold 54 (from the part and/or support materials).

Print head 40 may initially print one or more layers of support structure 52 onto receiving surface 36a to provide an adhesive base for the subsequent printing. This maintains good adhesion between the layers of 3D part 50 and platen 36, and reduces or eliminates any tolerance to flatness between receiving surface 36a of platen 36 and the x-y plane. After each layer is printed, controller 80 may direct platen gantry 38 to index platen 36 along the z-axis in the direction of arrow 86 by a single layer increment.

After support structure 52 is initially printed, print head 40 may then print layers of 3D part 50 and scaffold 54, and optionally any additional layers of support structure 52. As discussed above, the layers of support structure 52 are intended to support the bottom surfaces of 3D part 50 along the printing z-axis against curl forces, and the layers of scaffold 54 are intended to brace 3D part 50 against gravity along the vertical x-axis.

Figure 3:
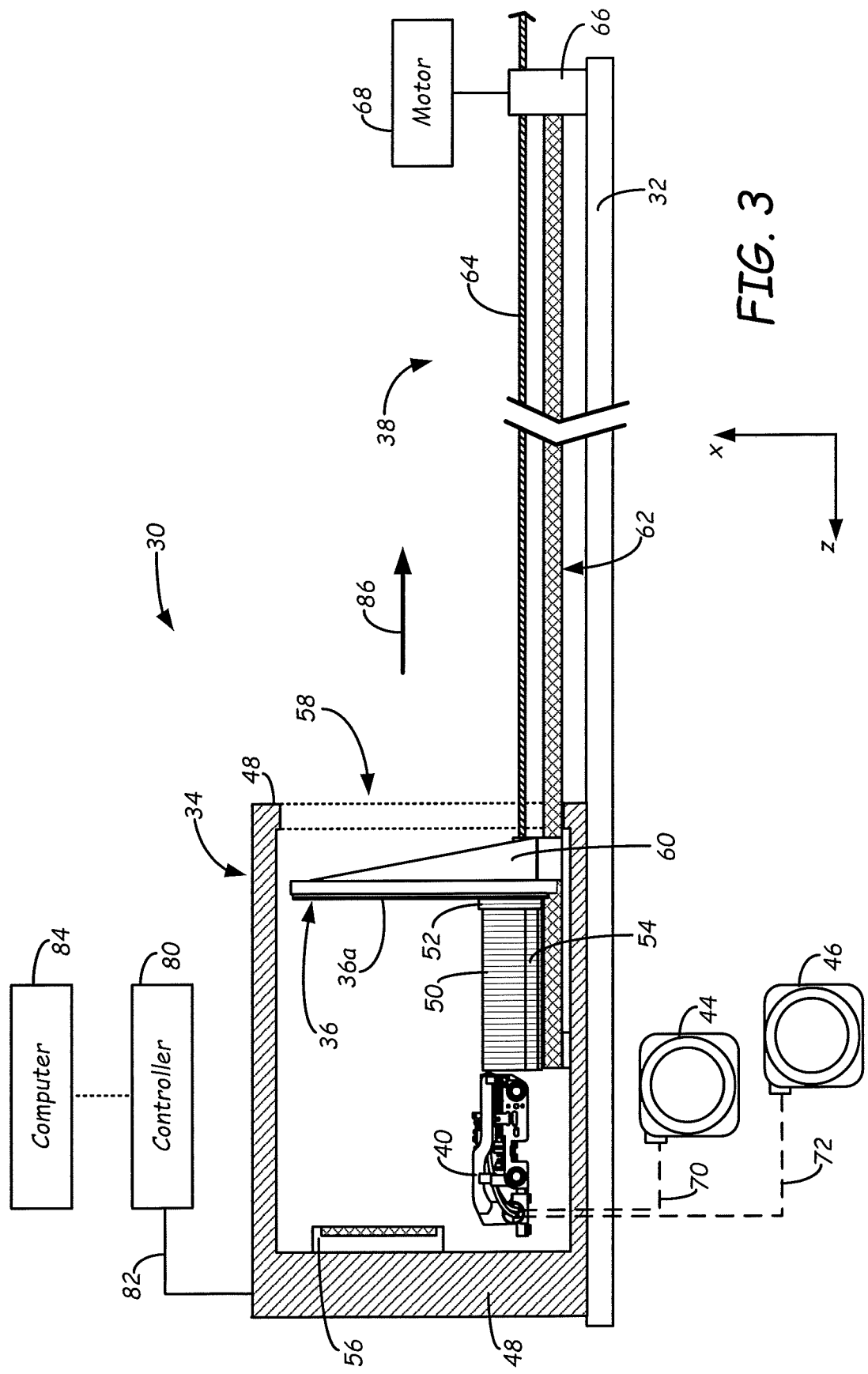
FIG. 3 is a side view of the first example system.

As shown in FIG. 3, guide rails 62 are illustrated with cross hatching and head gantry 42 is omitted for ease of viewability. As the printed 3D part 50 and scaffold 54 grow along the z-axis, the indexing of platen 36 in the direction of arrow 86 moves platen 36 through chamber 34 towards port 58. Port 58 desirably has dimensions that allow platen 36 to pass through without contacting chamber walls 48. In particular, port 58 is desirably parallel (or substantially parallel) to platen 36 (i.e., both extend in the x-y plane), with dimensions that are slightly larger than the cross-sectional area of platen 36. This allows platen 36 (and the growing 3D part 50 and scaffold 54) to pass through port 58 without interference, while also desirably reducing thermal loss through port 58.

As the printed layers of 3D part 50, support structure 52, and scaffold 54 move in the direction of arrow 86 through chamber 34 toward port 58, the temperature of chamber 34 gradually cools them down from their respective extrusion temperatures to the temperature in chamber 34. As mentioned above, this reduces the risk of distortions and curling. Gantry assembly 38 desirably indexes platen 36 at a rate that is slow enough such that the printed layers cool down to the temperature(s) of chamber 34, and reside in chamber 34 for a duration that is sufficient to substantially relieve cooling stresses, prior to reaching port 58. This allows the printed layers to be relaxed enough such that when they reach the temperature gradient at port 58, the temperature drop at the temperature gradient does not cause any substantial distortions or curling.

FIGS. 4A and 4B illustrate 3D part 50, support structure 52, scaffold 54, and platen 36 during the printing operation. 3D part 50 includes interior structure 50a and exterior surfaces 50b, where interior frame 50a functions in the same manner as scaffold 54 for laterally bracing the exterior surfaces 50b of 3D part 50. In alternative embodiments, depending on the geometry of 3D part 50, interior structure 50a may be omitted or may be printed from a support material that can be subsequently removed from 3D part 50 (e.g., a soluble support material). In embodiments in which interior structure 50a is printed from a soluble support material, interior frame 50a is desirably porous and/or sparse to increase the flow of a dissolving fluid (e.g., an alkaline aqueous solution) through the interior region of 3D part 50. This can increase the dissolution rate of interior structure 50a.

In the shown example, scaffold 54 includes ribbon portion 88 and conveyor base 90. Further details of this ribbon-base arrangement for scaffold 54 are discussed below. Briefly, ribbon portion 88 is connected to exterior surface 50b of 3D part 50 with small contact points to brace 3D part 50 against sagging due to gravity. The small contact points allows ribbon portion 88 to be readily broken apart or otherwise removed from 3D part 50 after the printing operation is completed. Conveyor base 90 is a planar sheet that supports ribbon portion 88, providing a smooth surface that can rest on and slide over guide rails 62 as platen 36 is indexed along the z-axis.

As further shown in FIGS. 4A and 4B, support structure 30 is desirably printed on receiving surface 36a to at least encompass the footprint area of 3D part 50 and scaffold 54 (i.e., the cross-sectional area of 3D part 50 and scaffold 54 in the x-y plane). In the shown example, support structure 30 only covers about the bottom 40% of platen 36. However, for 3D parts and scaffolds having larger geometries in the x-y plane, the entire surface of platen 36 may be used, allowing 3D parts having cross-sectional areas up to about the cross-sectional area of platen 36 to be printed. Furthermore, the lengths of the 3D parts are limited only by the length of platen gantry 38. Thus, system 30 is suitable for printing long 3D parts, having a variety of different cross-sectional geometries, such as airfoils, manifolds, fuselages, and the like.

As shown in FIG. 4B, platen 36 includes base indentation 91, which 91 is configured to align with the top surface of guide rails 62. This arrangement allows support structure 52 and conveyor base 90 of scaffold 54 to be printed flush against indentation 91. This allows support structure 52 and scaffold 54 to rest on and slide across the top surface of guide rails 62 while platen 36 is indexed in the direction of arrow 86.

Figure 5:
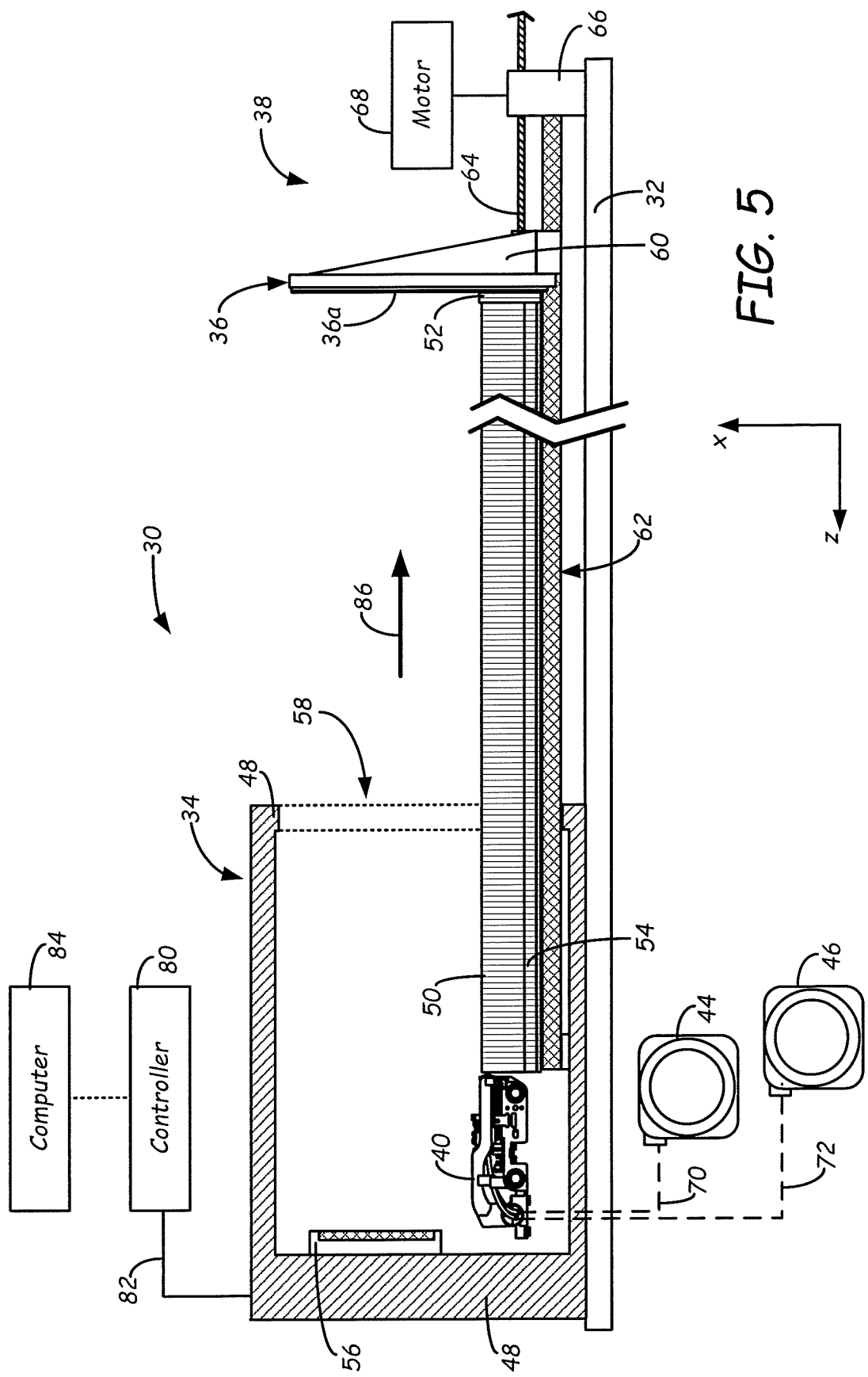
FIG. 5 is a side view of the first example system, illustrating the 3D part being printed horizontally.

As shown in FIG. 5, as platen gantry 38 continues to index platen 36 in the direction of arrow 86, the successive layers of 3D part 50 and scaffold 54 pass through the thermal gradient at port 58 and move outside of chamber 34. As discussed above, the printed layers desirably cool down to the temperature(s) of chamber 34 prior to reaching port 58 to reduce the risk of distortions and curling. Upon passing through port 58, the printed layers may then cool down to the ambient temperature outside of chamber 34 (e.g., room temperature).

The printing operation may continue until the last layer of 3D part 50 is printed and/or when platen 36 is fully indexed to the end of platen gantry 38. As can appreciated, allowing platen 36 to move out of chamber 34 increases the lengths of 3D parts that may be printed by system 30 compared to additive manufacturing systems having enclosed chambers.

After the printing operation is completed, the printed 3D part 50, support structure 52, scaffold 54, and platen 36 may be removed from system 30 (e.g., by disengaging platen 36 from platen gantry 38). Platen 36 may then be removed from support structure 30, and support structure 30 may be removed from 3D part 50 and scaffold 54 (e.g., by dissolving support structure 30). Scaffold 54 may then be broken apart from or otherwise removed from 3D part 50.

While system 30 is particularly suitable for printing 3D parts that are long along the z-axis (e.g., 3D part 50), system 30 may also print 3D parts that are shorter along the z-axis. In instances where 3D part 50 is short along the z-axis, such that the adhesiveness of support structure 52 is sufficient to support the 3D part in a cantilevered manner without substantial sagging, scaffold 54 may be omitted. However, as can be appreciated, as the length of a 3D part grows along the z-axis, support structure 52 alone is not sufficient to prevent remotely-printed layers of the 3D part from sagging under gravity. In this situation, one or more scaffolds (e.g., scaffold 54) may be printed along with the 3D part to laterally brace the 3D part.

FIGS. 6-9 show system 230, which is a second example additive manufacturing system having a platen starter piece and associated drive mechanism. As shown in FIG. 6, system 230 may operate in a similar manner to system 30 (shown in FIGS. 2-5), where the reference numbers for the respective features are increased by "200". In this embodiment, platen 36 and platen gantry 38 of system 30 are replaced with a platen starter piece 292 and drive mechanism 294.

Starter piece 292 is a removable print foundation having platen portion 296, platform portion 298, and reinforcing arms 300 (best shown in FIG. 8B). Platen portion 296 includes receiving surface 296a for receiving the printed support structure 252 in the same manner as receiving surface 36a of platen 36. Platform portion 298 includes edge segments 302 and central segment 304, where edge segments 302 are offset across from each other along the y-axis. Platen portion 296 is integrally formed with or otherwise connected to platform portion 298 at central segment 304, and does not extend laterally to edge segments 302. As such, platen portion 296 extends parallel to the x-y plane, and at a right angle to platform portion 298, which extends in the y-z plane. Reinforcing arms 300 are optional components that structurally reinforce platen portion 296.

Starter piece 292 may be fabricated from one or more polymeric and/or metallic materials. For example, starter piece 292 may be molded (e.g., injection molded) or printed with an additive manufacturing system from a polymeric material to provide a rigid piece capable of supporting the printed layers of 3D part 250, support structure 252, and scaffold 254. In an alternative embodiment, platform portion 298 may be a web-based film with platen portion 296 secured thereon.

As shown in FIGS. 6 and 7, drive mechanism 294 is a wheel-based drive mechanism that includes two pairs of drive wheels 306, guide rails 308, and motor 310, where, in FIG. 7, guide rails 308 are illustrated with cross hatching (and head gantry 242 is omitted) for ease of viewability. Prior to the printing operation, platform portion 298 of starter piece 292 may be inserted between the pairs of drive wheels 306. Platform portion 298 may also include one or more alignment tabs 312 (best shown in FIG. 8B) to align and slidably couple starter piece 292 to guide rails 308.

Guide rails 308 function as linear bearings along the horizontal z-axis in a similar manner to guide rails 62 (shown in FIGS. 2, 3, and 5). However, guide rails 308 may be considerably shorter in length compared to guide rails 62, thereby reducing the size of system 10 on table 232. For example, guide rails 308 may be retained entirely within chamber 234.

Figure 8A:
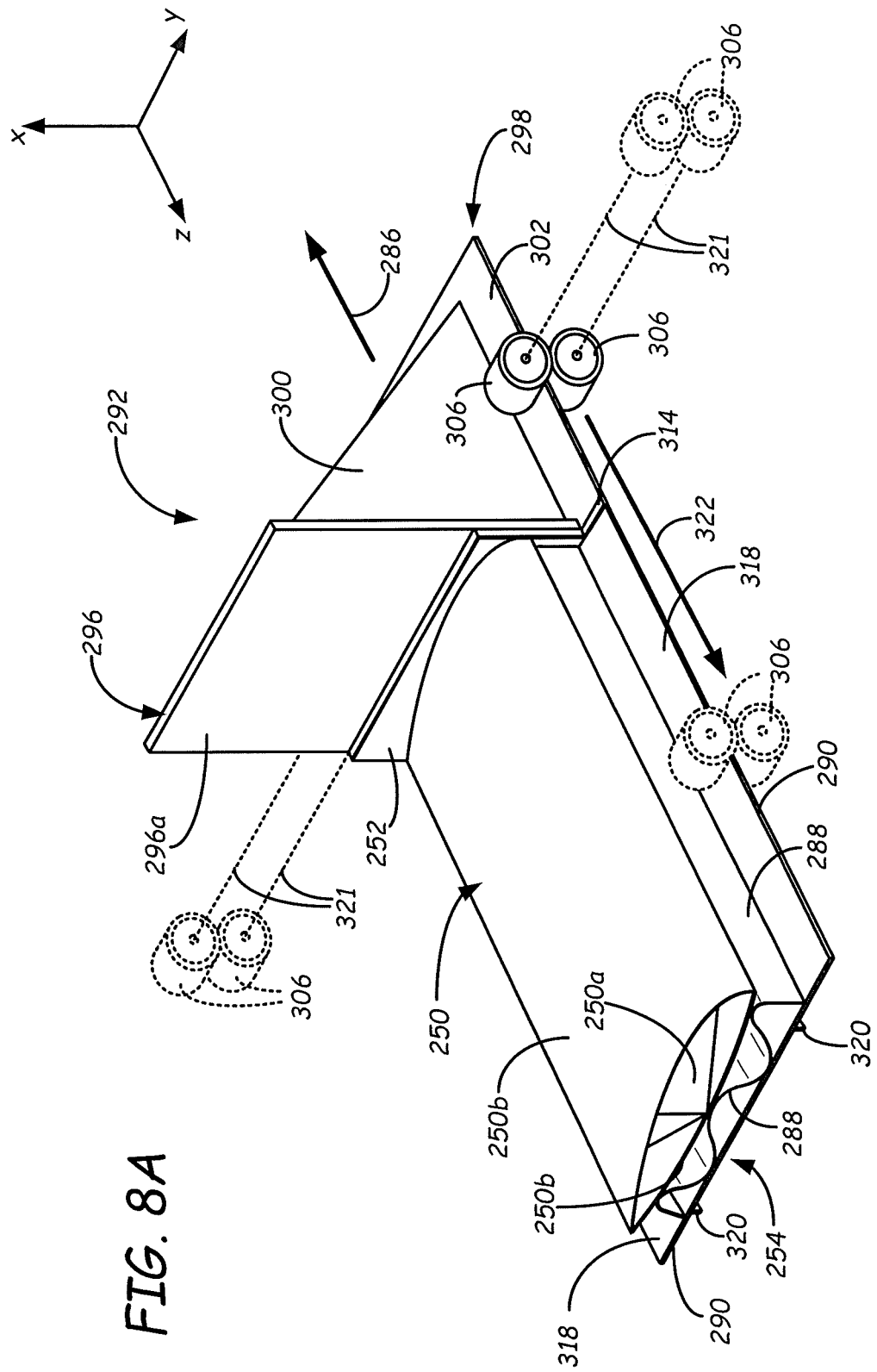
FIG. 8A is a perspective view of a 3D part, support structure, and scaffold printed on the platen starter piece.

During operation, print head 240 initially prints one or more layers of support structure 252 onto receiving surface 296a to provide an adhesive base for the subsequent printing. This maintains good adhesion between the layers of 3D part 250 and receiving surface 296a. However, as best shown in FIGS. 8A and 8B, the layers of support structure 252 also include edge segments 314 corresponding to edge segments 302 of starter piece 292, and alignment tabs 316 (shown in FIG. 8B) corresponding to alignment tabs 312 of starter piece 292.

After each layer of support structure 252 is printed, drive mechanism 294 may index starter piece 292 along the z-axis in the direction of arrow 286 by a single layer increment. In particular, as shown in FIG. 8A, each pair of drive wheels 306 may engage the opposing surfaces of one of the edge segments 302. Drive wheels 306 are operated by motor 310, which rotates drive wheels 306 to index starter piece 292 along the z-axis in the direction of arrow 286.

In alternative embodiments, drive mechanism 294 may be replaced with a variety of different drive mechanisms for engage with and moving starter piece 292, support structure 252, and scaffold 254 in the same manner. For example, drive wheels 306 may be replaced with cogs, textured wheels, spiked wheels, textured and/or tacky conveyor belts, and the like to engage one side of each edge segment 302, both sides of each edge segment 302, or combinations thereof.

After support structure 252 is printed, print head 240 may then print layers of 3D part 250 and scaffold 254, and optionally any additional layers of support structure 252. As further shown in FIGS. 8A and 8B, conveyor base 288 of scaffold 254 is printed to include edge segments 318 corresponding to edge segments 302 and 314, and alignment tabs 320 corresponding to alignment tabs 312 and 316. In alternative embodiments, alignment tabs 312, 316, and/or 320 may be omitted. In these embodiments, system 230 may include other suitable features (e.g., alignment pins) to maintain registration in the x-y plane.

As drive wheels 306 continue to index starter piece 292 in the direction of arrow 286, alignment tabs 316 of support structure 252 and alignment tabs 320 of scaffold 254 eventually reach and slidably couple with guide rails 308 to maintain proper registration in the x-y plane. Furthermore, as illustrated by arrow 322 in FIG. 8A, drive wheels 306 eventually pass edge segments 302 of starter piece 292, and engage edge segments 314 and 318 to continue to index support structure 250 and scaffold 254 in the direction of arrow 286. In some embodiments, system 230 may include one or more sensors (not shown) to provide feedback to controller 280, thereby maintaining proper indexing of scaffold 250. For example, system 230 may include one or more optical sensors to measure displacement of scaffold 250 along the z-axis, which may transmit signals to controller 280 to provide accurate an indexing of scaffold 250.

As can be appreciated, because drive wheels 306 engage scaffold 254 at both sides of edge segment 318 of scaffold 254, the opposing drive wheels 306 may need to be adjusted along the y-axis to compensate for the dimensions of 3D part 250. For instance, if 3D part 250 is very wide along the y-axis, the opposing pairs of drive wheels 306 may need to be separated further apart along the y-axis (as illustrated by separation lines 321 in FIG. 8A) to accommodate the wider support structure 252 and scaffold 254. Alternatively, if 3D part 250 is very narrow along the y-axis, the opposing pairs of drive wheels 306 may need to be moved closer together along the y-axis to reduce the widths of support structure 252 and scaffold 254. This reduces the needed sizes of support structure 252 and scaffold 254. However, in one embodiment, drive wheels 306 may be maintained at a separation distance along the y-axis that accommodates the widest dimensions that can be printed by system 230. In this embodiment, support structure 252 and scaffold 254 may be printed with widths that reach drive wheels 306.

Figure 8C:
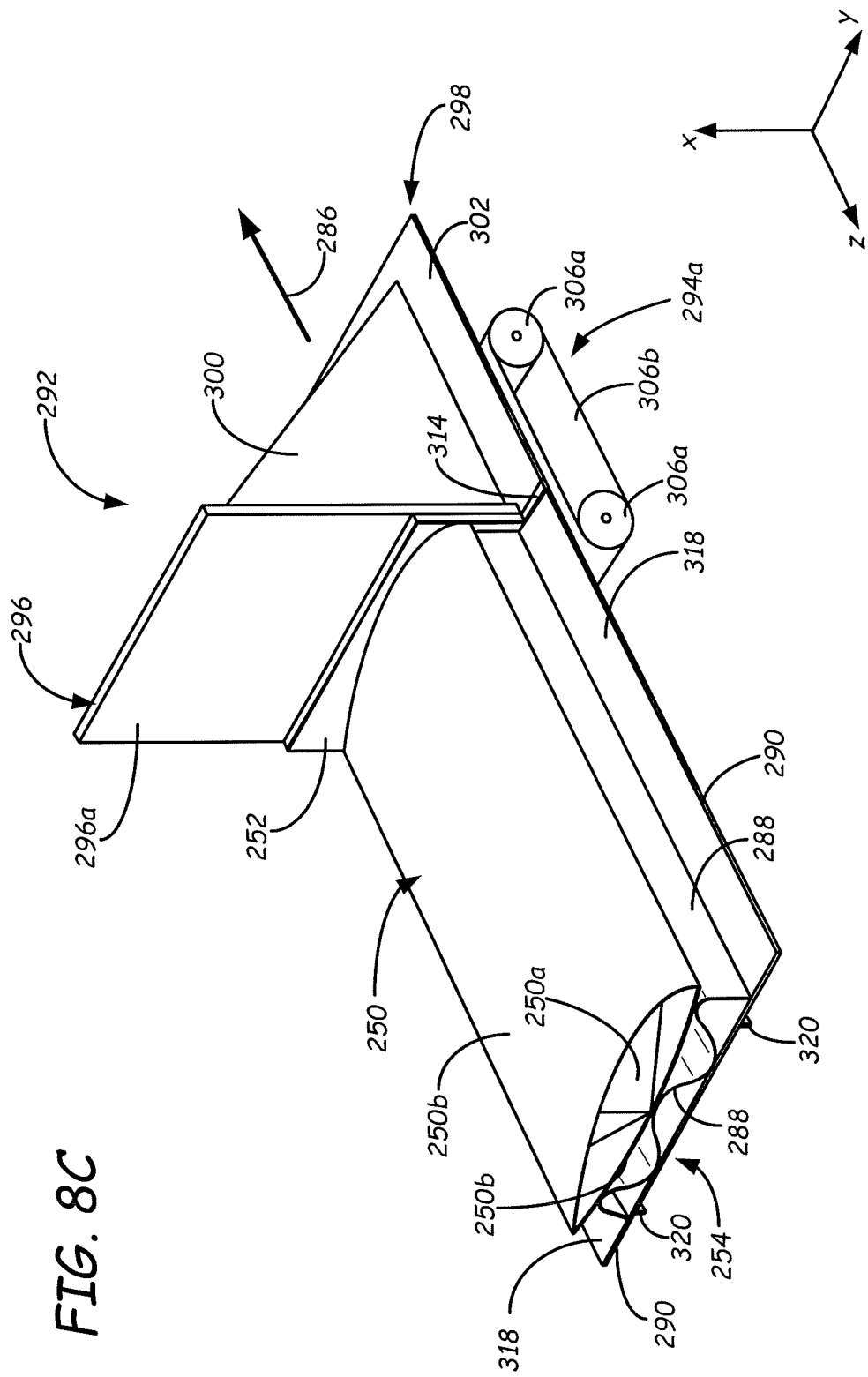
FIG. 8C is a perspective view of a 3D part, support structure, and scaffold printed on the platen starter piece, illustrating an alternative drive mechanism.

Alternatively, as shown in FIG. 8C, system 230 may include an alternative drive mechanism, such as drive mechanism 294a, that engages only the bottom surfaces of starter piece 292, support structure 252, and scaffold 254. As shown, drive mechanism 294a includes rollers 306a and drive belt 306b, where drive belt 306b engages the bottom surfaces of starter piece 292, support structure 252, and scaffold 254. The bottom surface engagement allows drive mechanism 294a to be used regardless of the dimensions of 3D part 250, support structure 52, and scaffold 254.

Drive belt 306b may engage with starter piece 292, support structure 252, and scaffold 254 with a variety of features, such a textured and/or tacky belt surface. This allows drive belt 306b to frictionally, mechanically, and/or adhesively grip the bottom surfaces of starter piece 292, support structure 252, and scaffold 254 to index or otherwise move them in the direction of arrow 286. The engagement between drive belt 306b and starter piece 292, support structure 252, and scaffold 254 may be based on the weights of starter piece 292, support structure 252, and scaffold 254, which hold them against drive belt 306b. Additionally, drive mechanism 230 may include additional components to assist in maintaining the engagement, such as with a magnetic coupling between starter piece 292 and drive mechanism 294. As can be further appreciated, while illustrated with a drive belt 306b, drive mechanism 294a may alternatively incorporate different features for engaging the bottom surfaces of starter piece 292, support structure 252, and scaffold 254 (e.g., drive wheels).

Figure 9:
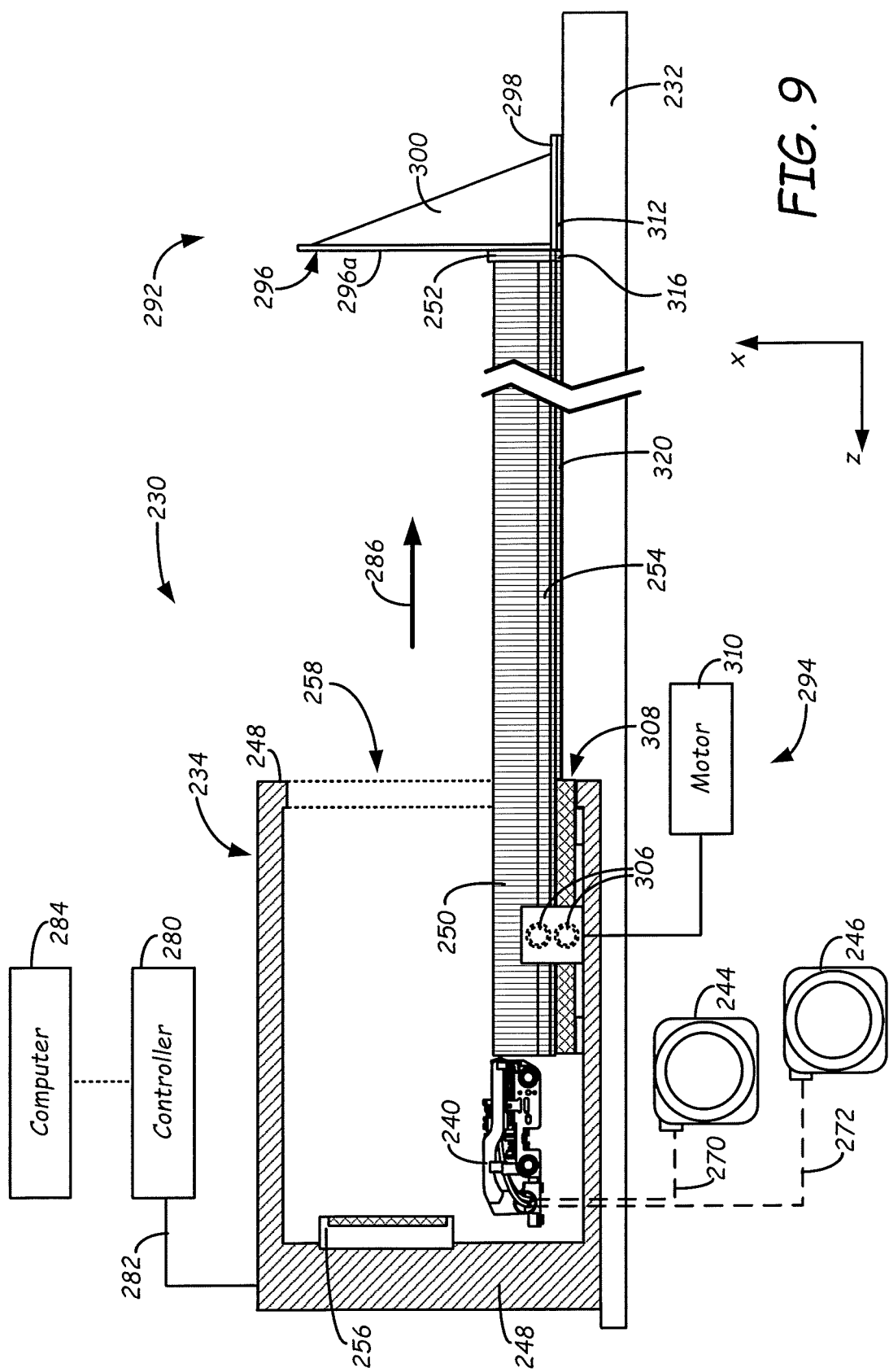
FIG. 9 is a side view of the second example system, illustrating the 3D part being printed horizontally.

As shown in FIG. 9, as drive mechanism 294 continues to index scaffold 254 in the direction of arrow 286, the successive layers of 3D part 250 and scaffold 254 pass through the thermal gradient at port 258 and move outside of chamber 234. In this embodiment, the table or surface 232 desirably steps up outside of chamber walls 248 to receive alignment tabs 312, 316, and 318, allowing them to slide across table 232 during the indexing. Furthermore, the stepped-up portion of table 232 may be treated or polished, may include low-friction material(s) (e.g., polytetrafluoroethylene), and/or may include air jets or other mechanisms for creating an air bearing (as further described below), to thereby reduce the sliding friction with alignment tabs 312, 316, and 318. Alternatively, in embodiments in which alignment tabs 312, 316, and 318 are omitted, the stepped-up portion of table 232 may be flush with or slightly below the elevation of guide rails 308 to receive conveyor base 288 of scaffold 254.

Upon passing through port 258, the printed layers may then cool down to the ambient temperature outside of chamber 234 (e.g., room temperature). The printing operation may continue until the last layer of 3D part 250 is printed. As can be appreciated, by printing support structure 252 and scaffold 254 with edge segments 314 and 318 that are engagable by drive mechanism 294, system 230 effectively grows its own conveyor mechanism. The use of a conveyor-base scaffold in this manner allows guide rails 308 to be relatively short, and even remain within chamber walls 248. This reduces the overall size of system 230, and effectively allows 3D part 250 to be printed with an unbound length along the z-axis.

Figure 10:
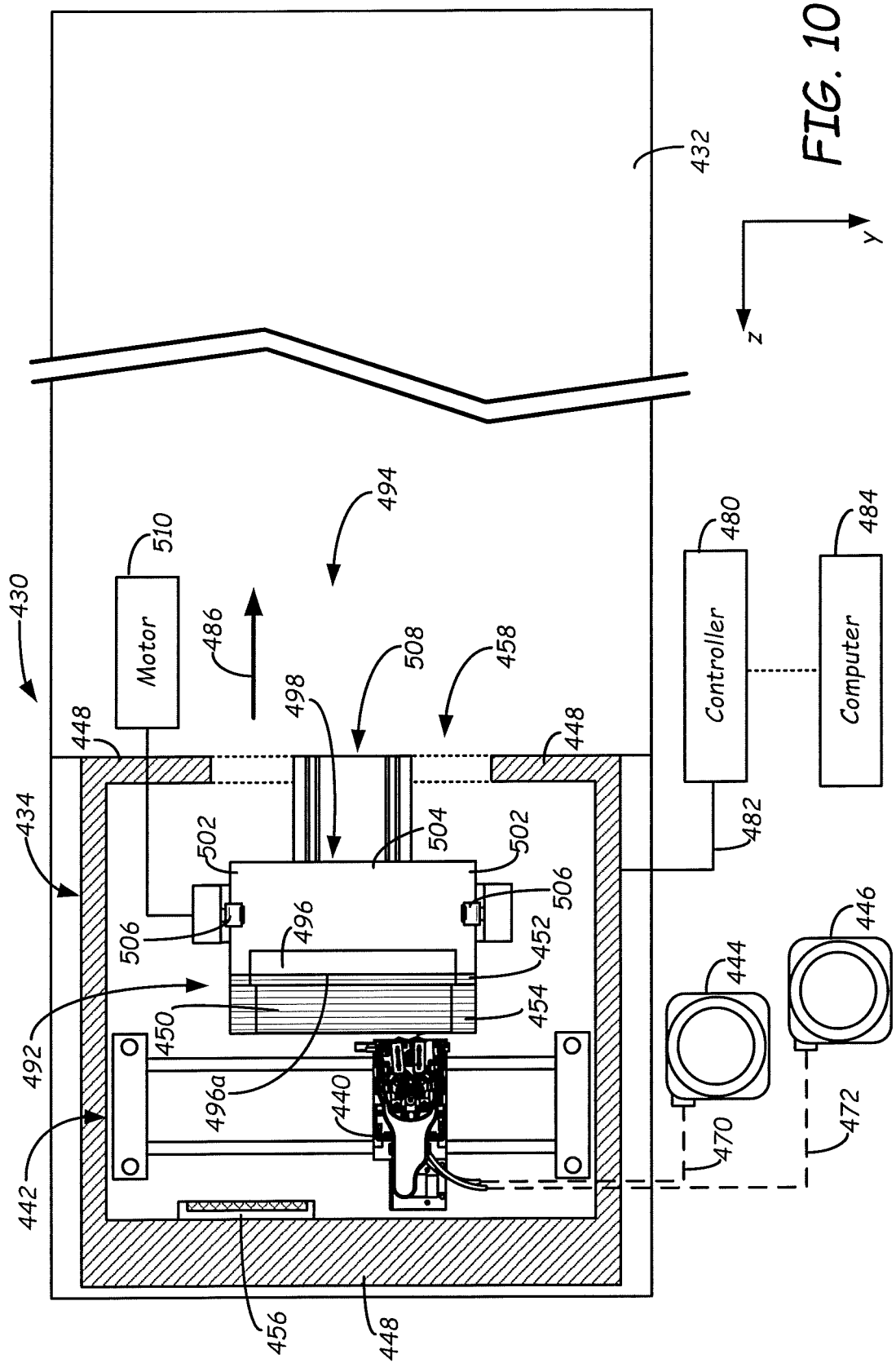
FIG. 10 is a top view of a third example additive manufacturing system of the present disclosure having a wedge starter piece for printing a 3D part horizontally.

FIGS. 10-14 show system 430, which is a third example additive manufacturing system having a wedge starter piece and associated drive mechanism. As shown in FIG. 10, system 430 may operate in a similar manner to system 230 (shown in FIGS. 6-9), where the reference numbers for the respective features are increased by "400" from those of system 30 (shown in FIGS. 2-5) and by "200" from those of system 230. In this embodiment, the platen starter piece 292 of system 230 is replaced with a wedge starter piece 492.

Starter piece 492 is a print foundation that is similar to starter piece 292, and includes wedge portion 496 (in lieu of platen portion 296) and platform portion 498. Wedge portion 496 has a sloped geometry that includes receiving surface 496a for receiving the printed layers of support structure 452. Platform portion 498 includes edge segments 502 and central segment 504, and functions in the same manner as platform portion 298 of start piece 292. Wedge portion 296 is integrally formed with or otherwise connected to platform portion 298 at central segment 504, and does not extend laterally to edge segments 502. As such, receiving surface 496a extends parallel to the x-y plane, and at a right angle to platform portion 498, which extends in the y-z plane.

Starter piece 292 (shown in FIGS. 6-9) and starter piece 492 illustrate example starter pieces of the present disclosure. Each starter piece of the present disclosure may include a platform portion and a receiving surface, where the particular geometry for structurally reinforcing the receiving surface relative to the platform portion may vary. In embodiments in which the receiving surface is small, no additional structural reinforcement is necessary, and the starter piece may have an "L"-shaped or block-shaped geometry. As the size of the receiving surface increases, one or more structural reinforcements (e.g., reinforcing arms 300 and the sloped geometry of wedge portion 496) may be desired to prevent the receiving surface from flexing or wobbling during printing operations.

As shown in FIGS. 10 and 11, drive mechanism 494 is a wheel-based drive mechanism that functions in the same manner as drive mechanism 294, and includes two pairs of drive wheels 506, guide rails 508, and motor 510, where, in FIG. 7, guide rails 308 are illustrated with cross hatching (and head gantry 242 is omitted) for ease of viewability. Prior to the printing operation, platform portion 498 of starter piece 492 may be inserted between the pairs of drive wheels 506. Print head 440 may then initially print one or more layers of support structure 452 onto receiving surface 496a, where the sloped geometry of wedge portion 496 reinforces receiving surface 496a.

However, as shown in FIG. 12, receiving surface 496a of wedge portion 496 has a small cross-sectional area compared to receiving surfaces 36a and 296a, and is also smaller than the combined footprint areas of 3D part 450 and scaffold 454. As such, in this embodiment, support structure 452 may grow with an increasing cross-sectional area in the x-y plane. This may be accomplished by printing the successive layers of support structure 452 with increasing cross-sectional areas in the x-y plane. For example, the successive layers of support structure 452 may be printed with an angle of increasing size (e.g., angle 526) up to about 45 degrees in any direction from the z-axis without requiring support from the previous layers.

Figure 13A:
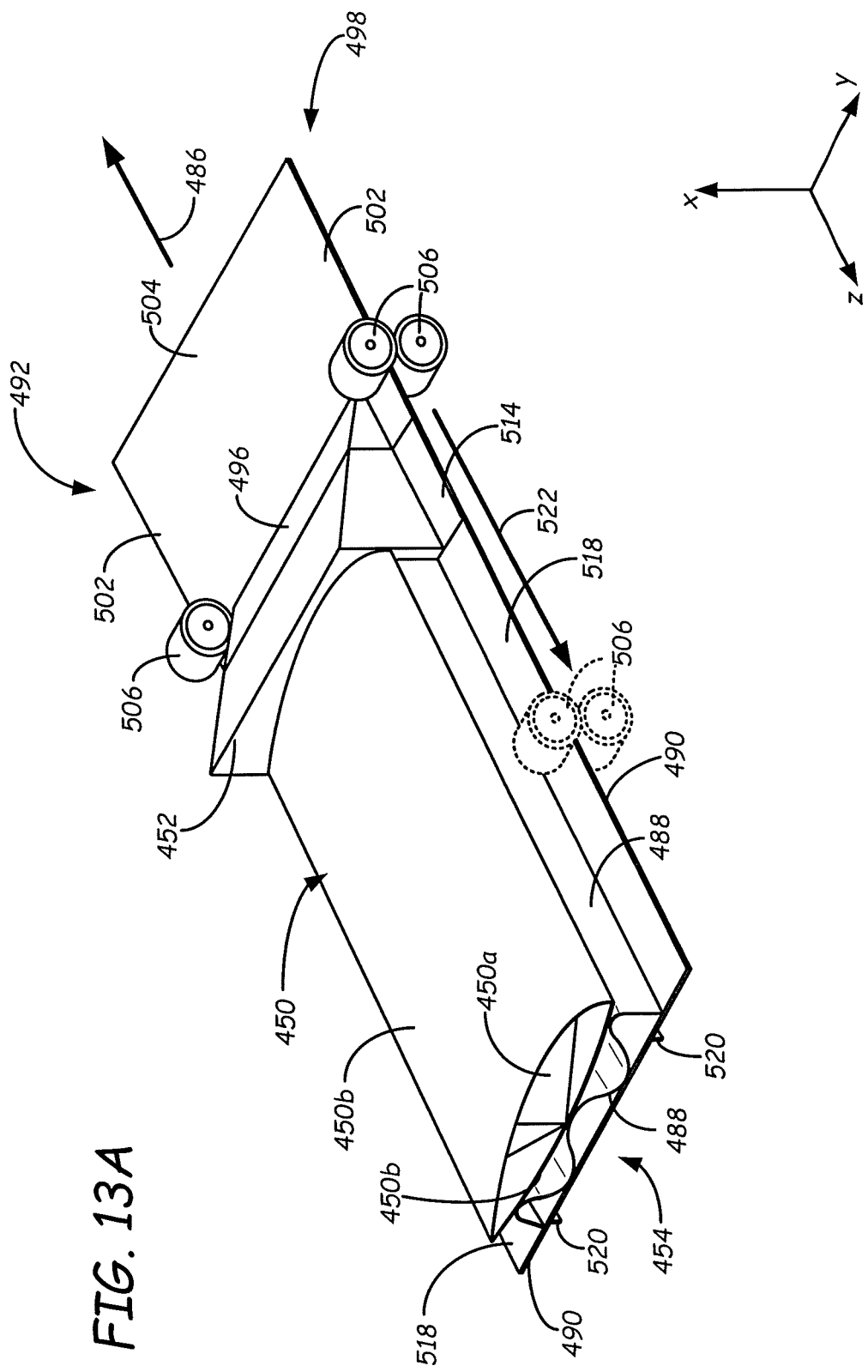
FIG. 13A is a perspective view of a 3D part, support structure, and scaffold printed on the wedge starter piece.
Figure 13B:
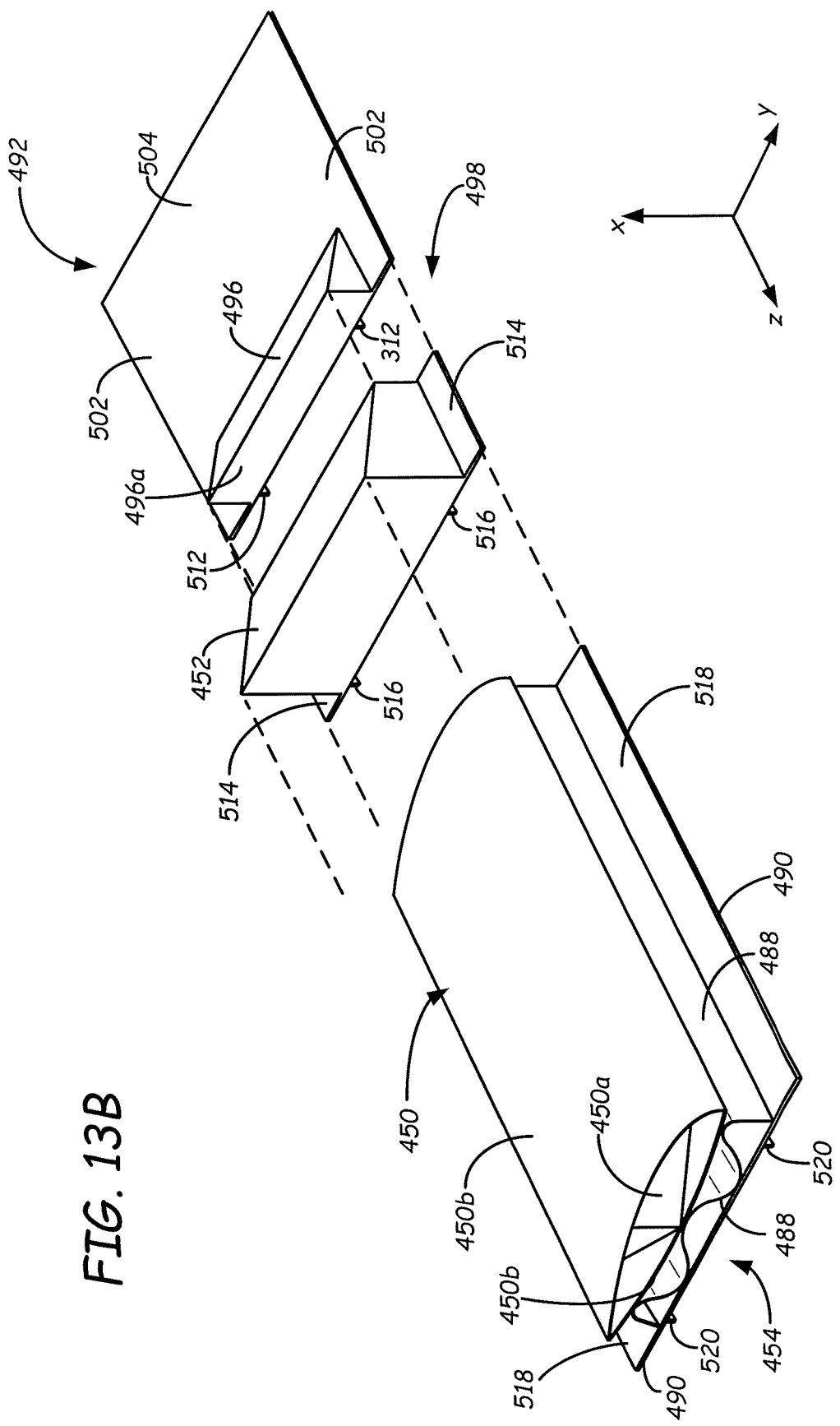
FIG. 13B is an exploded perspective view of the 3D part, support structure, and scaffold printed on the wedge starter piece.

Support structure 452 may grow with an increasing cross-sectional area at least until it encompasses the footprint area of 3D part 450 and scaffold 454 (i.e., the cross-sectional area of 3D part 450 and scaffold 454 in the x-y build plane). Additionally, as best shown in FIGS. 13A and 13B, the layers of support structure 452 may be printed to include edge segments 514 corresponding to edge segments 502 of starter piece 492, and alignment tabs 516 (shown in FIG. 13B) corresponding to alignment tabs 512 of starter piece 492.

After each layer of support structure 452 is printed, drive mechanism 494 may index starter piece 492 along the z-axis in the direction of arrow 286 by a single layer increment in the same manner as discussed above for starter piece 292 and drive mechanism 294. Thus, the last printed layer of support structure 452 functions as a print foundation receiving surface for 3D part 450 and scaffold 454. Print head 440 may then print layers of 3D part 450 and scaffold 454, and optionally any additional layers of support structure 452. As further shown in FIGS. 13A and 13B, conveyor base 488 of scaffold 454 is printed to include edge segments 518 corresponding to edge segments 502 and 514, and alignment tabs 520 corresponding to alignment tabs 512 and 516.

As drive wheels 506 continue to index starter piece 492 in the direction of arrow 486, alignment tabs 516 of support structure 452 and alignment tabs 520 of scaffold 454 eventually reach and slidably couple with guide rails 508 to maintain proper registration in the x-y plane. Furthermore, as illustrated by arrow 522 in FIG. 13A, drive wheels 506 eventually pass edge segments 502 of starter piece 492, and engage edge segments 514 and 518 to continue to index support structure 450 and scaffold 454 in the direction of arrow 486.

Figure 14:
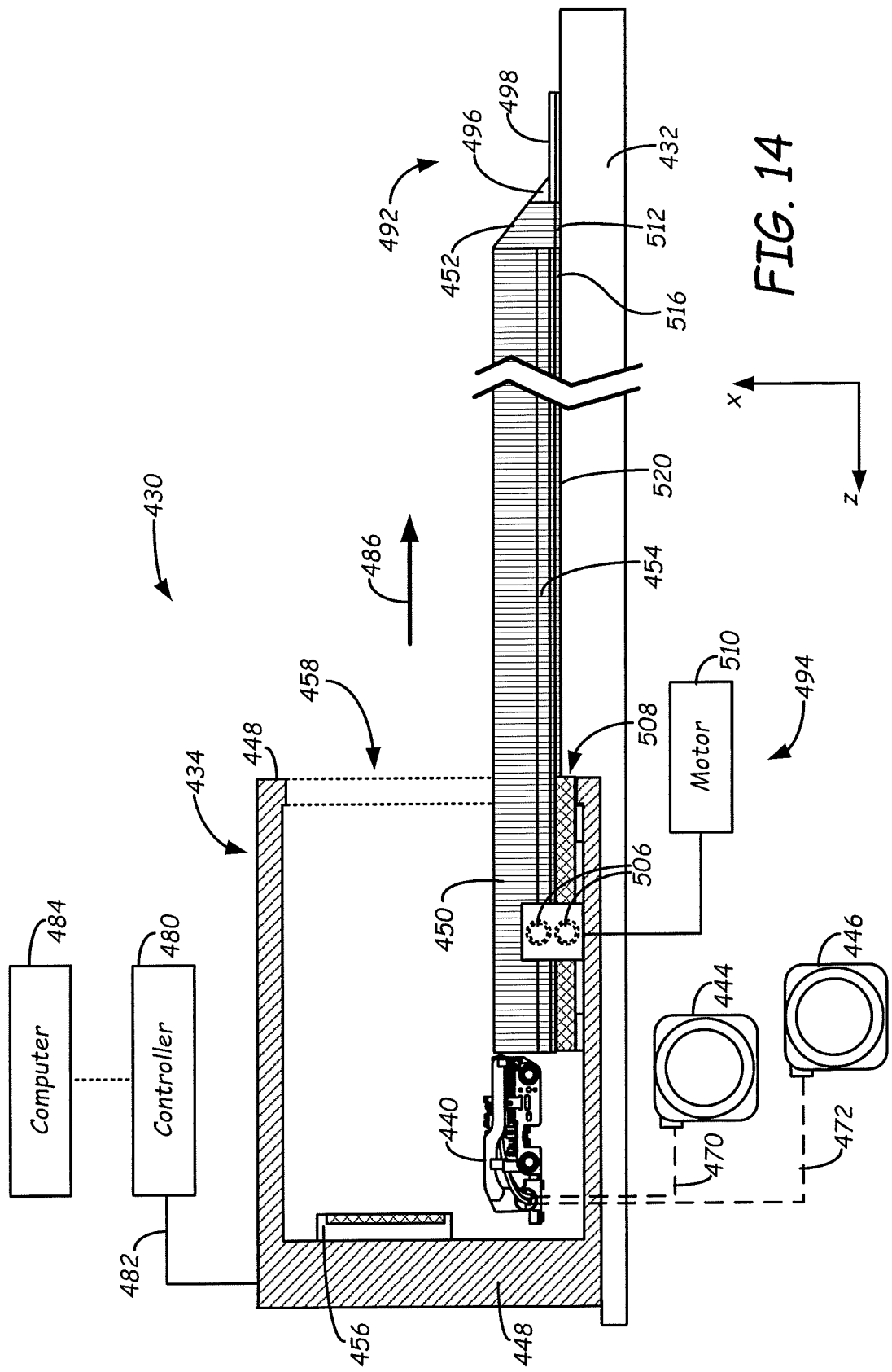
FIG. 14 is a side view of the third example system, illustrating the 3D part being printed horizontally.

As shown in FIG. 14, as drive mechanism 494 continues to index scaffold 454 in the direction of arrow 486, the successive layers of 3D part 450 and scaffold 454 to pass through the thermal gradient at port 458 and move outside of chamber 434. Upon passing through port 458, the printed layers may then cool down to the ambient temperature outside of chamber 434 (e.g., room temperature).

The printing operation may continue until the last layer of 3D part 450 is printed, or, as discussed below, additional 3D parts may be printed with the use of scaffold 454, where portions of scaffold 454 may function as print foundation receiving surfaces for the additional 3D parts. The use of starter piece 492 achieves the same benefits as the use of starter piece 292 by reducing the overall size of system 430, and allowing 3D part 450 to be printed with an unbound length along the z-axis. In addition, wedge portion 496 reduces the size and weight of starter piece 492 relative to starter piece 292, and allows the last layer of support structure 452 to function as a print foundation receiving surface for 3D part 450 and scaffold 454.

Air Bearing for Horizontal Printing

Figure 15:
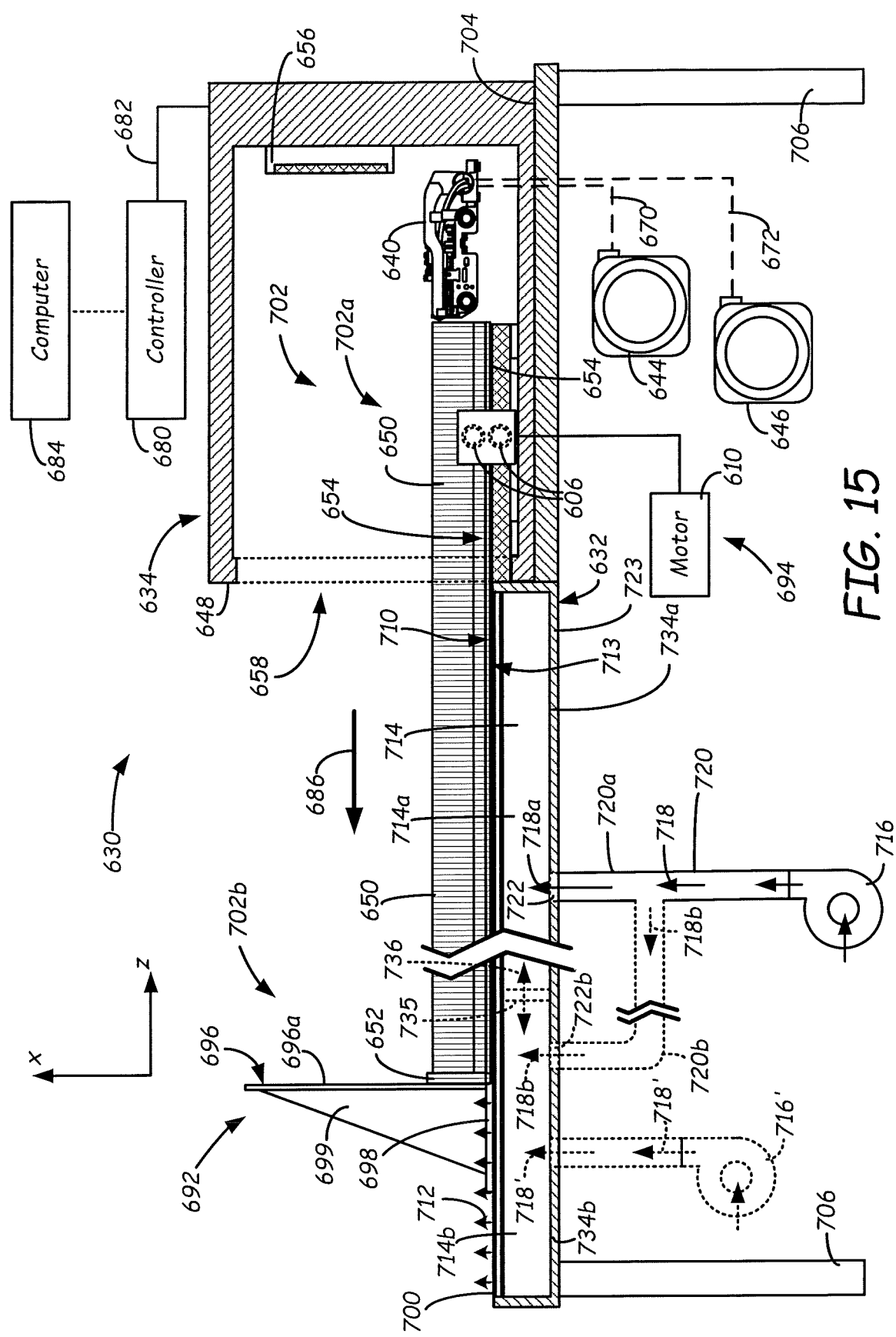
FIG. 15 is a simplified side view of an exemplary additive manufacturing system configured to generate an air bearing beneath a 3D part under construction, in accordance with embodiments of the present disclosure.
Figure 16:
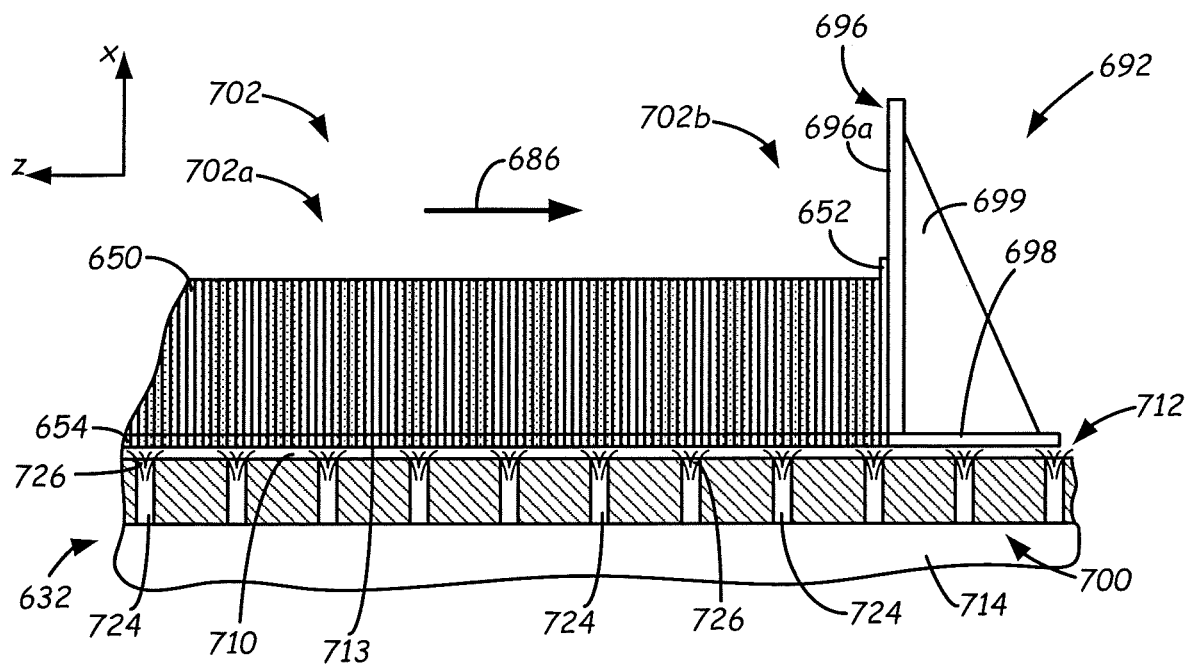
FIGS. 16 and 17 respectively are simplified side cross-sectional and top views of a portion of the system of FIG. 15, in accordance with embodiments of the present disclosure.
Figure 17:
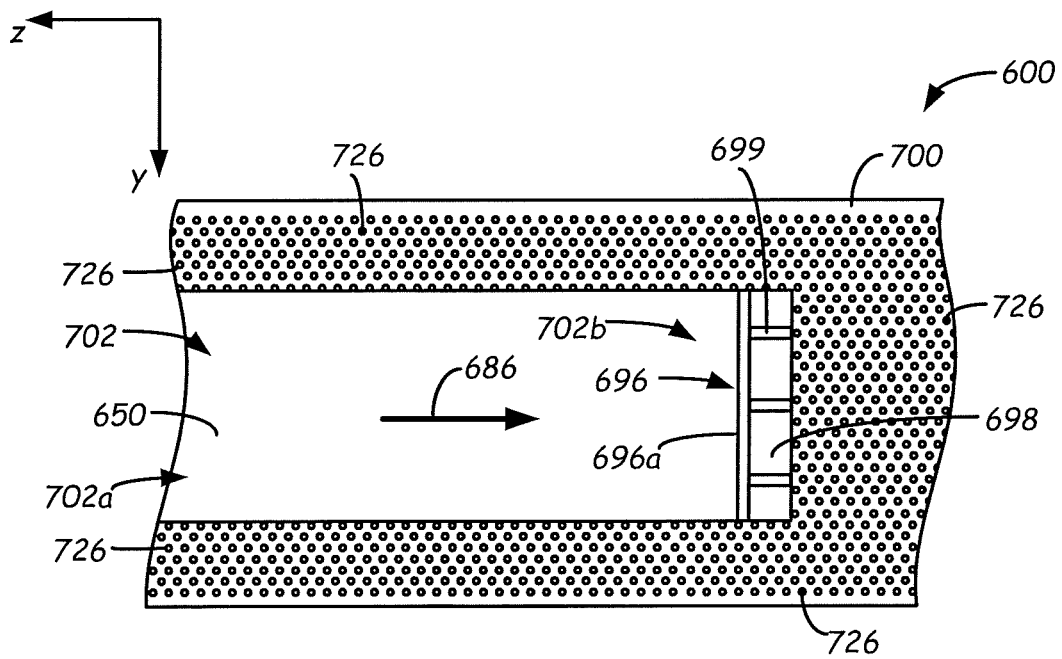

FIG. 15 is a simplified side view of an additive manufacturing system 630 configured to generate an air bearing beneath a 3D part under construction, in accordance with embodiments of the present disclosure. FIGS. 16 and 17 respectively are simplified side cross-sectional and top views of a portion of the system 630 of FIG. 15, in accordance with embodiments of the present disclosure.

The additive manufacturing system 630 may operate in a similar manner to system 30 (shown in FIGS. 2-5), system 230 (shown in FIGS. 6-9), and system 430 (shown in FIGS. 10-14), where the reference numbers for the respective features are generally increased by "600" from those of system 30, by "400" from those of system 230, and by "200" from those of system 430. Thus, the elements of the system 630 should be construed as including one or more embodiments of the corresponding elements of systems 30, 230 and 430 described herein, and the components of system 630 indicated in FIGS. 15-17 may operate in accordance with one or more embodiments of the corresponding elements of systems 30, 230 and 430. The system 630 may also incorporate components of the systems 30, 230 and 430 that are not illustrated in FIGS. 15-17.

For example, the additive manufacturing system 630 may include a print foundation 696, formed in accordance with one or more embodiments described herein. Accordingly, print foundation 696 may include a starter piece 692 having a platform portion 698, a receiving surface 696a, and reinforcing arms 699, for example. In some embodiments, the system 630 includes a drive mechanism 694 configured to drive the print foundation 696, such as the platform portion 698 along the z-axis (i.e., horizontal printing axis) in the direction of arrow 686 during a print operation to index the print foundation (e.g., starter piece 692) in response to the completion of a printed layer by the print head 640 contained within a print chamber 634. The drive mechanism 694 may include drive wheels 606 that are driven by a motor 610, for example.

The system 630 also includes a print head 640 that is configured to print one or more layers onto the receiving surface 696a using consumable assemblies 644 and/or 646, in accordance with embodiments described herein. For example, the print head 640 may print 3D part layers 650, support structure layers 652, scaffold layers 654, and/or other printed layers to the surface 696a, in accordance with embodiments described herein. Each of these layers are oriented obliquely to the z-axis, such as substantially perpendicular to the z-axis. After a layer has been printed by the print head 640, the drive mechanism 694 indexes the printed structure in the direction 686 along the z-axis, allowing the print head 640 to commence printing the next layer.

The print head 640 and other components of system 630 used to print the layers are located in a build zone, such as, for example within a chamber 634. The chamber 634 may be heated by a heating mechanism 656, and it may be open-sided, enclosed, or entirely open. In the shown embodiment, during a print operation, the print foundation 696 and the printed structure extend through an output port 658 of the chamber 634, as these components are driven along the z-axis in the direction 686 by drive mechanism 694.

The system 630 includes a controller 680, which may operate in accordance with controller 80, and may comprise one or more control circuits configured to monitor and operate the components of system 630 to perform various functions described herein. The controller 680 may communicate over a communication line 682 with various devices of the system 630, such as chamber 634 (e.g., heating mechanism 656), print head 640, motor 610, sensors, calibration devices, display devices, user input devices, and/or other devices of the system. The system 630 and/or the controller 680 may also communicate with a computer 684, which is one or more computer-based systems that may be separate from the system 630, or alternatively may be an internal component of the system 630. The computer 684 includes computer-based hardware, such as data storage devices, processors, memory modules, and the like for generating and storing tool path and related printing instructions. The computer 684 may transmit these instructions to the system 630 (e.g., to the controller 680) to perform printing or other operations.

The system 630 includes a table 632 extending along the z-axis, which may form the tables or surfaces 32, 232, and 432 shown in FIGS. 2, 3, 5-7, 9-11 and 14, for example. The table 632 includes an air platen 700 that is configured to support a body 702 as the body 702 is driven along the z-axis by drive mechanism 694 in the direction 686 during a print operation. Embodiments of the body 702 include a printed body 702a, such as 3D part 650, support structure 652, scaffold 654, and/or another body that is printed in a layer-by-layer manner by print head 640 of the additive manufacturing system 630. As mentioned above, the 3D part 650, the support structure 652, and the scaffold 654 may be in accordance with the corresponding embodiments discussed above for systems 30, 230 and 430, such as 3D part 50, 250 and 450, support structure 52, 252 and 452, and scaffold 54, 254 and 454, for example. The body 702 may also include a non-printed body 702b, such as starter piece 692, platform portion 698, and/or another body that is not printed by the print head 640, as shown in FIGS. 15-17, for example. These components may be formed in accordance with the embodiments described for the corresponding components of the systems 30, 230 and 430.

The table 632 may include a support surface 704 in the build zone for supporting the chamber 634 and/or other components of system 630, such as print head 640, drive mechanism 694 and motor 610. The support surface 704 is configured to convey the body 702 at a level height to the air platen 700 as the body 702 extends beyond the build zone, such as through the port 658. Thus, the air platen 700 may be raised relative to the support surface 704, as shown in FIG. 15.

Table 632 may include legs 706 (e.g., four or more legs) for leveling and elevating its surfaces. Alternatively, table 632 may be supported on a separate table, a bench, a floor, or other suitable structure.

The air platen 700 is configured to generate an air bearing 710 which applies a lifting force to the body 702 and reduces sliding friction between a bottom surface 713 of the body 702 and the table 632, and resistance to indexing of the body 702 in the direction 686 along the z-axis by the drive mechanism 694. In some embodiments, the force is sufficient to lift the body 702, or portions thereof, from the table 632 resulting in the air bearing 710 filling a gap between the bottom surface 713 of the body 702 and the air platen 700, as shown in FIG. 16, which further reduces resistance to indexing of the body 702 in the direction 686 along the z-axis by the drive mechanism 694.

The air platen 700 may be configured to generate air bearing 710 using any suitable technique. In the shown embodiment, the air platen 700 comprises an array of air jets 712 each having an air inlet 724 and an air outlet aperture 726, as illustrated in FIGS. 15-17. The velocity of air discharged by the air jets 712 may optionally be adjusted using the controller based on the weight of the body 702. The body 702, such as the bottom surface 713, may also be adjusted to provide a sufficient surface area in the y-z plane such that the pressure applied to the body 702 by the air jets 712 will raise the body 702 off the table 632, or reduce the friction between the bottom surface 713 and the table 632 by a desired amount.

In some embodiments, the table 632 includes at least one pressure chamber 714 beneath the air platen 700 and enclosed by a chamber wall 723, and at least one blower 716, as shown in FIG. 15. In some embodiments, the air platen 700 forms a ceiling of the pressurized chamber 714 (FIGS. 15 and 16). The one or more blowers 716 are configured to drive an airflow, generally shown as 718, along an airflow path 720 and into the pressure chamber 714 through a port 722 of chamber wall 723, as shown in FIG. 15. Any suitable blower 716 and configuration may be used to generate the desired airflow 718. Thus, while the blower 716 is illustrated as being external to the chamber 714, it is understood that the blowers 716 used by the system 630 may be internal to the chamber 714. Pressure chamber 714 is preferably substantially sealed except for the air jets 712 provided in air platen 700. As a result, pressurized air is forced into the air inlets 724 and discharged through the apertures 726 of air jets 712 in response to the airflow 718 driven into the pressure chamber 714 by the blower 716 to form the air bearing 710, as shown in FIG. 16. The number and size of the apertures 726, and the spacing between the apertures, may be selected to produce the desired air pressure and air bearing 710 based on the expected airflow 718 into the chamber 714.

In some embodiments, table 632 may be divided into multiple table sections, generally referred to as 734, that are linked together along the z-axis. For example, the table 632 may include table sections 734a and 734b (FIG. 15), which may be joined together using any suitable technique. Each of the table sections 734 may be isolated from adjoining table sections by a divider wall, such as wall 735 (phantom lines) between table sections 734a and 734b, as shown in FIG. 15. In some embodiments, the pressure chamber 714 is divided into multiple pressure chambers each corresponding to one of the table sections 734. For example, table section 734a may include a pressure chamber 714a, and table section 734b may include a pressure chamber 714b, as shown in FIG. 15. In other embodiments, the pressure chambers 714 of adjoining table sections may be interconnected through a suitable port, which is indicted by arrow 736, such as through the dividing wall 735 between the table sections, as shown in phantom lines in FIG. 15. This allows a single blower 716 or airflow 718 to be used to pressurize the interconnected pressure chambers 714, such as through the port 722, for example.

One or more blowers 716 may be used to drive one or more of the airflows 718 into the one or more pressure chambers 714 for the air platen 700 at each respective table section 734. In some embodiments, a single blower 716 may be used to drive separate airflows into multiple pressure chambers 714 by dividing the air pathway 720 into separate branches for each pressure chamber 714. For example, the air pathway 720 may be divided into a branch 720a (solid lines) that is coupled to the port 722 of the pressure chamber 714a, and a branch 720b that is coupled to a port 722b of the pressure chamber 714b, as indicated in phantom lines in FIG. 15. The airflow 718 generated by the blower 716 is then divided into an airflow 718a through air pathway 720a and an airflow 718b through air pathway 720b. The airflows 718a and 718b pressurize the corresponding chambers 714a and 714b and generate corresponding air bearing 710 at their respective air platens 700 of the table sections 734a and 734b.

Airflows 718 may also be driven into the individual pressure chambers 714 of the table sections 734 using separate blowers 716. For example, blower 716 may be used to drive the airflow 718 or 718a into pressure chamber 714a, while a blower 716' may be used to drive an airflow 718' into pressure chamber 714b of the table section 734b, as shown in phantom lines in FIG. 15.

In summary, the table 632 may be comprised of several table sections 734 that are linked together and extend along the z-axis from the build environment. The table sections 734 may include separate and/or interconnected pressure chambers 714. Airflows 718 may be driven into the pressure chambers 714 of the table sections 734 using one or more blowers 716. The generated air flow is distributed across the apertured surface of the table 632 to generate air bearing 710, similar to that of an air hockey table. The 3D part under construction is supported on the air bearing 710 as it is incremented from the build zone. The air bearing 710 reduces friction on the 3D part and/or its print foundation to practically zero. Hence there is reduced drag on the motor and/or other drive mechanisms that move the 3D part through the printer.

Some embodiments of the present disclosure are directed to a method of printing three-dimensional parts with an additive manufacturing system, such as using the additive manufacturing system 630 described above. In the method, a body 702a, such as a three-dimensional part 650, a support structure 652, scaffolding 654, and/or another body, is printed in a layer-by-layer manner along the z-axis onto a print foundation 696, such as that of a non-printed body 702b, within a build zone, such as, for example, the chamber 634, as shown in FIG. 15. The print foundation 696, the printed body 702a, and/or the non-printed body 702b are indexed along the z-axis beyond the build zone, such as through a port 658 of the chamber 634, for example, using a drive mechanism 694 during the printing of the body 702a. A portion of the printed body 702a, and/or the non-printed body 702b extends through the port 658 over a table 632 and is supported on an air bearing 710 formed by a plurality of air jets 712, during the indexing of the printed body 702a and/or the non-printed body 702b along the z-axis, as shown in FIGS. 15-17.

In some embodiments of the method, the bodies 702a and/or 702b are supported by driving at least one airflow 718 into at least one pressure chamber 714 of the table 632 using at least one blower 716, and discharging the plurality of air jets 712 through apertures 726 in an air platen 700 of the table 632 in response to driving the at least one airflow 718. As discussed above, the table 632 may include multiple table sections 734 each having their own isolated pressure chamber (e.g., pressure chambers 714a and 714b), or connected pressure chambers 714 (e.g., through port 736).

Although the present disclosure has been described with reference to preferred embodiments, workers skilled in the art will recognize that changes may be made in form and detail without departing from the spirit and scope of the disclosure.

What is claimed is:

1. An additive manufacturing system for printing 3D parts, the system comprising:
   a print foundation;
   a print head provided in a build zone and configured to print a 3D part onto the print foundation in a layer-by-layer manner in a vertical print plane;
   a drive mechanism configured to index the print foundation along a horizontal axis during printing of the 3D part; and
   a table extending along the horizontal axis, the table comprising an air platen configured to generate an air bearing beneath a portion of the 3D part being printed as it advances from the build zone, the air platen comprising a plurality of air jets terminating in upward-facing apertures.

2. The system of claim 1, wherein the print foundation comprises a starter piece, and wherein the drive mechanism engages the starter piece at least at the beginning of the printing process.

3. The system of claim 1, further comprising a print chamber having chamber walls and a port extending through one of the chamber walls, wherein:
   at least one of the chamber walls has a port extending therethrough;
   the build zone is in the print chamber;
   the drive mechanism is configured to index the print foundation along the horizontal axis and through the port; and
   the table is positioned adjacent the port and is configured to support the portion of the 3D part extending through the port on the air bearing.

4. The system of claim 3, wherein the chamber is heated.

5. A method of printing 3D parts with an additive manufacturing system, the method comprising:
   printing a 3D part onto a print foundation in a layer-by-layer manner in a vertical print plane;
   indexing the print foundation along a horizontal axis using a drive mechanism during printing the 3D part; and
   supporting a portion of the 3D part on an air bearing on a table surface formed by a plurality of air jets during indexing of the print foundation along the horizontal axis.

6. The method of claim 5, wherein:
   printing the 3D part comprises printing the 3D part on a starter piece of the print foundation; and
   indexing the print foundation along the horizontal axis comprises engaging the starter piece along only a side surface of the starter piece using the drive mechanism.

7. The method of claim 5, wherein:
   printing the 3D part comprises printing the 3D part within a chamber using a print head; and
   supporting the portion of the 3D part comprises supporting the portion of the 3D part extending through a port of the chamber on the air bearing during indexing of the print foundation along the horizontal axis.

8. The method of claim 7, further comprising heating the chamber.

9. The method of claim 7, wherein indexing the print foundation along the horizontal axis comprises indexing the print foundation through the port of the chamber.

* * * * *